US006727925B1

(12) United States Patent
Bourdelais

(10) Patent No.: US 6,727,925 B1
(45) Date of Patent: Apr. 27, 2004

(54) BROWSER-BASED ROOM DESIGNER

(76) Inventor: Michelle Lyn Bourdelais, 898 Massachusetts Ave., Arlington, MA (US) 02476

( * ) Notice: Subject to any disclaimer, the term of this patent is extended or adjusted under 35 U.S.C. 154(b) by 0 days.

(21) Appl. No.: 09/466,940

(22) Filed: Dec. 20, 1999

(51) Int. Cl.⁷ .................................................. G09G 5/00
(52) U.S. Cl. ....................................... 345/852; 345/850
(58) Field of Search ................................ 345/848–852, 345/836, 782, 757, 706, 764–765, 419

(56) References Cited

U.S. PATENT DOCUMENTS

| 5,742,291 | A |   | 4/1998  | Palm              |         |
|-----------|---|---|---------|-------------------|---------|
| 5,894,310 | A | * | 4/1999  | Arsenault et al.  | 345/419 |
| 5,977,978 | A | * | 11/1999 | Carey et al.      | 345/419 |
| 5,986,675 | A |   | 11/1999 | Anderson et al.   |         |
| 6,016,147 | A | * | 1/2000  | Gantt             | 345/419 |
| 6,046,744 | A | * | 4/2000  | Hoppe             | 345/419 |
| 6,331,858 | B2| * | 12/2001 | Fisher            | 345/582 |

OTHER PUBLICATIONS

Web pages located at <http://www.puertabella.com/puertabella.com/yourstyle/>, Your Style Interactive Design Assistant, Puerta Bella, LLC, visited Jan. 1 and 19, 2000.
Web pages located at <http://www.intellitek.com/>, The Furniture Link, Intellitek, Inc., visited Dec. 6, 1999.
Web pages located at <http://www.goodhome.com/Home_Page.ASP>, iDecorate, Goodhome.com, visited Dec. 6, 1999.
Web pages located at <http://www.furniture.com>, Room Planner, Furniture.com, Inc., visited Dec. 6, 1999.
Web pages located at <http://furniturepoint.homepoint.com>, Virtual Showroom Galeries, HomePoint Corp., visited Dec. 6, 1999.
Web pages located at <http://homeportfolio.com/HomePage/index.html>, HomePortfolio, Inc., visited Dec. 6, 1999.
Web pages located at <http://living.com>, Room Designer, living.com, visited Dec. 6, 1999.
Web pages located at <http://www.ethanallen.com/index.html>, Ethan Allen Marketing Corp., visited Dec. 6, 1999.
Web pages located at <http://www.behome.com/cgi–bin/shop/index.tam>, Shop For Your Home, Benchmark Industries, visited Dec. 6, 1999.
Web pages located at <http://www.marthastewart.com/>, Martha Stewart Living Omnimedia Inc., visited Dec. 6, 1999.
Web pages located at <http://www.housebeautiful.com/>, House Beautiful, Hearst Communications, Inc., visited Dec. 6, 1999.

(List continued on next page.)

Primary Examiner—Sy D. Luu
Assistant Examiner—Le Nguyen
(74) Attorney, Agent, or Firm—Dane Butzer

(57) ABSTRACT

A system for designing a room using a browser connected to a system remote to the browser. The perspective view of the room is displayed. Specification is accepted of furnishings to be added to the room. Simplified images of the furnishings are displayed in the perspective view of the room. Manipulation of the simplified images of the furnishings is accepted and displayed. The room is rendered with substantially photorealistic perspective images of the furnishings in the perspective view of the room. The substantially photorealistic perspective images of the furnishings are obtained from the remote system, and the room is rendered in accordance with the manipulation of the simplified images so as to present corresponding perspective views of the furnishings. Preferably, specification of properties for the furnishings also are accepted and displayed. When the room is rendered, the room preferably is rendered with photorealistic perspective images also in accordance with the specification of independent properties. Specification of a recommended group of furnishings also preferably is accepted.

32 Claims, 16 Drawing Sheets

OTHER PUBLICATIONS

Web pages located at <http://www.ikea-usa.com/content/>, Inter IKEA Systems B.V., visited Dec. 6, 1999.

Web pages located at <http://www.3DShoppingcom/>, 3DShopping.com, visited Dec. 6, 1999.

Web pages located at <http://www.myhome.com/html/home.shtml>, rooms by: DESIGN, MyHome.com, visited Dec. 6, 1999.

* cited by examiner

BROWSER-BASED ROOM DESIGNER

Background of the Invention

1. Field of the Invention

The invention concerns designing a room on a browser connected to a remote system through, for example, the World Wide Web or another network connection. In particular, the invention concerns interactively designing a room by specifying attributes for the room, interactively specifying and manipulating plural images of furnishing such as furniture in simplified form in a perspective view of the room, and then rendering a perspective view of the furnishings in the room using photorealistic images acquired from the remote system.

2. Description of the Art

Online commerce is rapidly becoming an important part of the World Wide Web. Users can connect to the web using web browsers, view photorealistic images of desired products on their browsers, and then order those products. Web sites now exist where users can view and purchase furnishings for a room, for example furniture, rugs, draperies, wall paper and the like. These web sites allow a user to view photorealistic images of prearranged settings that include the furnishings.

Conventionally, users can specify properties for a group of the furnishing in one of these settings, for example an appearance (e.g., color) of materials used for furniture in the setting. The photorealistic image of the setting can then be updated based on the specified properties.

However, conventional web sites do not permit users to add user-specified furnishings to one of these settings and then to view a photorealistic perspective image of the setting with the added furnishings. For example, conventional web sites do not allow users to add a chair or a couch to a setting in order to see how the chair or couch looks in a photorealistic perspective rendering of the setting. Conventional web sites also do not allow users to move individual furnishings independently around in a perspective view of a setting. Furthermore, conventional web sites do not allow users to specify independent properties for individual furnishings.

Thus, at conventional web sites, users cannot view a photorealistic image of a room designed to include a desired set of furnishings, with each furnishing having an individually specified position and orientation and individually specified properties. As a result, users cannot experiment with how their own combinations of furnishings will look, but rather are limited to viewing predefined combinations of furnishings in predefined settings. For example, users cannot see how any one given furnishing will work with their own previously acquired furnishings in a particular room setting.

Because of the foregoing deficiencies, users tend not to purchase furniture and other furnishings online. Rather, they tend to insist on actually seeing the furnishings in, for example, a showroom of a traditional "brick and mortar" store. As a result, online sales of furnishings, and in particular of furniture, have not realized their full potential.

SUMMARY OF THE INVENTION

An object of the invention is to allow a user to design a room, and in particular to specify furnishings for the room, using a web browser connected to a remote system. Another object of the invention is to allow the user to design the room even if the user is connected to the remote system across a relatively slow connection (e.g., a modem-based connection across the World Wide Web).

Accordingly, one aspect of the invention allows a user to interactively and independently manipulate simplified images of furnishings in a perspective view of a room displayed by a browser. An example of the simplified images are wire frame images. Preferably, the user also can specify independent properties for the furnishings in the room. When the user is satisfied with the arrangement and properties of the furnishings, the user can have the room rendered with substantially photorealistic perspective images of the furnishings.

By virtue of the invention, the user can design a room that includes many different types and style of furnishings in a vast array of arrangements. Because the furnishings can be independently specified and manipulated, the user has great flexibility in designing the room. Thus, the user can see how selected furnishings will work together in a real-world setting, increasing the possibility that the user will purchase the modeled furnishings online.

In addition, the simplified images of the furnishings can be manipulated as soon as the simplified images are obtained by the browser. As a result, the user can manipulate the simplified images without having to wait for substantially photorealistic perspective images of the furnishings to be obtained by the browser. Obtaining such substantially photorealistic perspective images can take a significant amount of time. Thus, this invention allows the user more rapidly to begin to manipulate images of the furnishings. As a result, the user's viewing experience is improved, thereby further increasing the possibility that the user will purchase the modeled furnishings online.

Furthermore, because the images are provided by the remote site, the invention allows the user to view arrangements of currently available real-world furnishings in a perspective view of a room. As a result, the party operating the remote site can ensure that any modeled furnishings are available for purchase.

Preferably, the substantially photorealistic perspective images of the furnishings are obtained by the browser while the user manipulates the simplified images and specifies properties for the furnishings. Thus, the user need not wait for all of the substantially photorealistic perspective images to be obtained in order to have the room rendered. The amount of time spent by the user waiting for images to be obtained is therefore reduced, further improving the user's viewing experience.

Accordingly, one preferred embodiment of the invention is a method for designing a room using a browser connected to a system remote to the browser. A perspective view of the room is displayed. Specification is accepted of individual furnishings to be added to the room. Simplified images of the individual furnishings are displayed in the perspective view of the room. Independent manipulation of the simplified images of the individual furnishings is accepted and displayed in the perspective view of the room. In this context, the term "independent" means independent of manipulation of other furnishings in the room. The room is rendered with substantially photorealistic perspective images of the individual furnishings in the perspective view of the room. The substantially photorealistic perspective images are obtained from the remote system, and the room is rendered in accordance with the independent manipulation of the simplified images so as to present corresponding perspective views of the individual furnishings.

The furnishings according to the invention can include furniture. The furnishings also can include room accessories other than furniture, for example rugs, draperies, wall paper and the like.

Preferably, at least part of the substantially photorealistic perspective images are obtained from the remote system while the simplified images are being independently manipulated. Furthermore, accepting and displaying independent manipulation of the simplified images preferably involves accepting and displaying independent position changes for the simplified images in the perspective view of the room, as well as accepting and displaying independent orientation changes for the simplified images in the perspective view of the room. Preferably, accepting and displaying manipulation of the simplified images also involves scaling the simplified image within the perspective view of the room in accordance with the position changes.

By virtue of the foregoing operations, the invention allows a user to design a room that includes many different types and style of furnishings in a vast array of arrangements and to view a photorealistic perspective view of the room including the furnishings.

In the preferred embodiment, independent properties are accepted and displayed for the individual furnishings. In this context, the term "independent" means that the properties do not have to be related to properties for other furnishings in the room. Preferably, the simplified images are displayed also in accordance with the specification of independent properties. Likewise, when the room is rendered, the room preferably is rendered with photorealistic perspective images also in accordance with the specification of independent properties. Examples of properties that can be specified include, but are not limited to, a manufacturer for the furnishings, a style for the furnishings, a color scheme for the furnishings, or a material used in the furnishings. At least part of the substantially photorealistic perspective images preferably are obtained from the remote system while the independent properties are being specified.

By virtue of these operations, the invention allows a user to combine many different types of furnishings with many different properties in a designed room. Thus, when the room is rendered with substantially photorealistic perspective images, the user can see how the different types of furnishings appear together.

Preferably, specification of a recommended group of furnishings also is accepted. When a recommended group of furnishings has been specified, the step of accepting and displaying independent manipulation of the simplified images also accepts and displays independent manipulation of the simplified images of the furnishings included in the recommended group. Likewise, the step of rendering the room also renders the room with substantially photorealistic perspective images of the furnishings included in the recommended group. Independent properties also are accepted and displayed for individually specified furnishings and for the furnishings in the recommended group. When the room is rendered, the room is rendered with photorealistic perspective images also in accordance with the specification of independent properties.

By virtue of these operations, the invention allows a user to start with a recommended group of furnishings. Then, the user can independently manipulate and change the properties of the furnishings in the recommended group to suit the user's own needs and tastes.

The preferred embodiment also accepts and displays specification of attributes for the room, for example a size of the room. When the perspective view of the room is displayed, the view is displayed in accordance with the specification of attributes for the room.

These operations allow a user to tailor the setting for the furnishings to reflect a particular room that the user desires to design.

Another embodiment of the invention is a method of providing images and code for designing a room to a browser connected to a system remote to the browser. According to the method, rotatable and scalable substantially photorealistic perspective images of different types of furnishings are generated. The substantially photorealistic perspective images for each different type of furnishing differ according to properties for that type of furnishing. Rotatable and scalable simplified images of the different types of furnishings also are generated. The substantially photorealistic perspective images and the simplified images are placed on the remote system for access by the browser. Also placed on the remote system is code for enabling the browser to design a room using the simplified images and the substantially photorealistic perspective images. The images and code are provided from the remote system to the browser responsive to requests from the browser.

Yet another embodiment of the invention is a method for designing a room using a browser connected to a system remote to the browser. According to the method, a user specifies individual furnishings to be displayed in a perspective view of the room. The user independently manipulates simplified images of the individual furnishings in the perspective view of the room. The user also preferably specifies independent properties for the individual furnishing. When the user is satisfied with the arrangement and properties for the furnishings, the user instructs the browser to render the room with substantially photorealistic perspective images of the individual furnishings in the perspective view of the room. The substantially photorealistic perspective images are obtained from the remote system.

Yet another embodiment of the invention is code which enables a user to design a room using a browser as set forth above.

Of course, speed is not always a consideration for a user. In addition, other solutions to enhancing speed of a room designer may be developed. Thus, in another aspect the invention is a room designer that allows a user to interactively and independently manipulate any types of images, for example photorealistic images, of furnishings in a perspective view of a room displayed by a browser. Embodiments of this aspect of the invention include a method and code that allow a user to so design a room using a browser.

This brief summary has been provided so that the nature of the invention may be understood quickly. A more complete understanding of the invention may be obtained by reference to the following description of the preferred embodiments thereof in connection with the attached drawings.

DETAILED DESCRIPTION OF THE PREFERRED EMBODIMENTS

Computing Equipment Architecture

Figure 1:
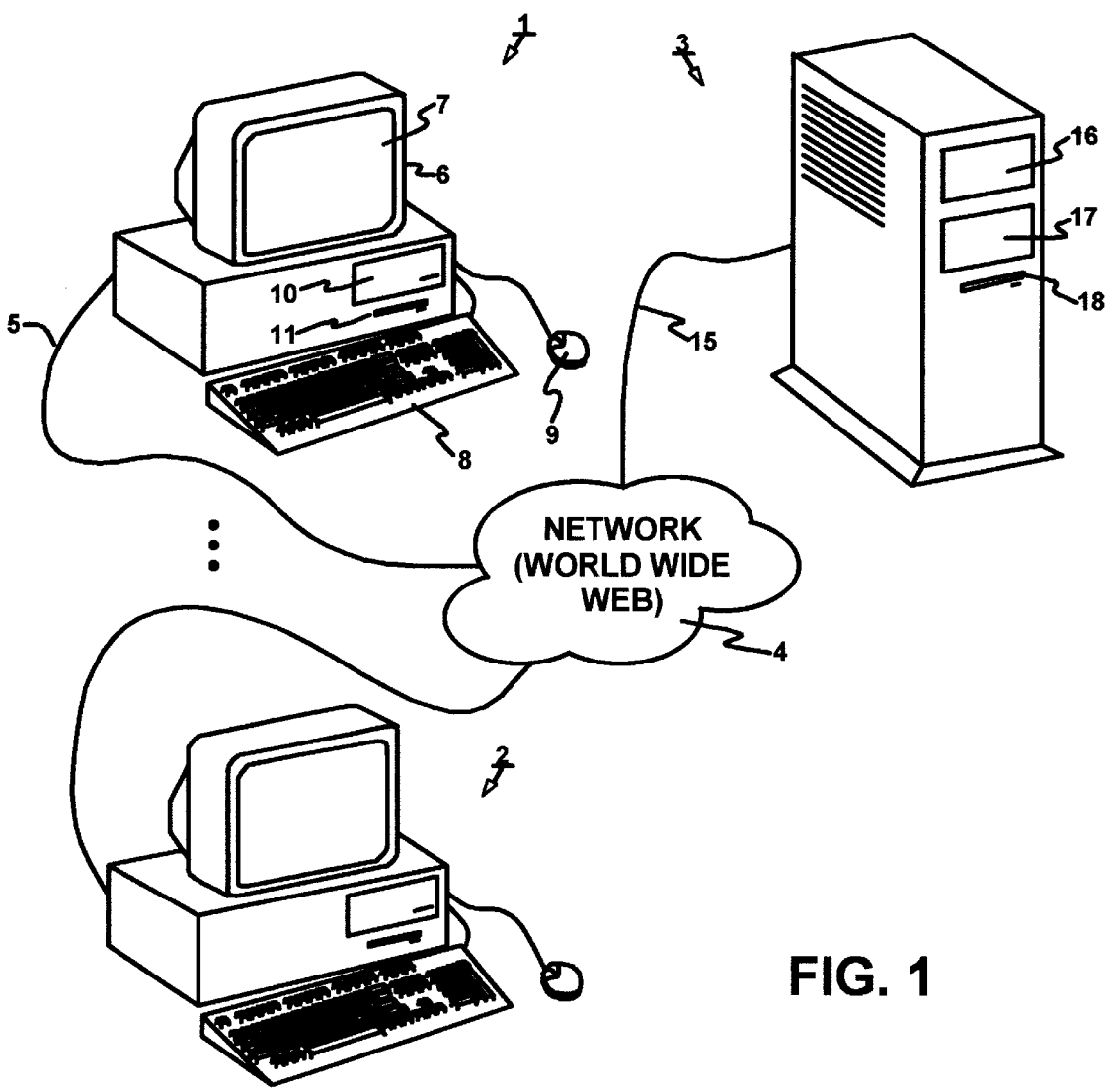
FIG. 1 is a representational view of computer systems which may be used to implement the invention.

FIG. 1 is a representational view of computer systems which may be used to implement the invention. Shown in FIG. 1 are computer systems 1 and 2 connected to computer system 3 through a network such as World Wide Web 4. Computer systems 1 and 2 are representative examples of systems on which a browser can run according to the invention. Such a browser connects to remote computer system 3 through the network. A browser running on computer system 1 or 2 preferably obtains images and code from remote computer system 3 so as to implement the invention, as explained in detail below.

In FIG. 1, computer systems 1 and 2 are depicted as PC-compatible standalone computer systems which preferably operate under Microsoft Windows 95, 98 or NT. However, the invention may be implemented on any type of computing equipment on which a browser can run. Examples of such computing equipment include, but are not limited to, standalone computer systems operating under an Apple operating system, a LINUX operating system or a UNIX operating system, web-TV systems, and dedicated web browsing terminals (i.e., dumb terminals). Thus, while the following descriptions of computer systems 1 and 2 provide examples of computer systems which may be utilized to implement the invention, the invention is in no way limited to use of such computer systems.

Furthermore, two computer systems are shown connected to remote computer system 3 through the network so as to illustrate that plural computer systems preferably can access remote computer system 3 according to the invention. However, in the preferred embodiment of the invention, any number of computer systems (including a single computer system) may be connected to remote computer system 3 through the network. For the sake of brevity, the invention will be described hereinafter with reference to computer systems 1 and 3.

As shown in FIG. 1, computer system 1 is connected to network 4 through network interface 5. While network interface 5 is depicted as a cable, the invention is equally applicable to computer systems which utilize other types of connections such as wireless connections.

Computer system 1 is provided with display 6 having screen 7 for displaying images to a user. Preferably, display 6 is capable of displaying substantially photorealistic images of furnishings for a room according to the invention.

Computer system 1 also is provided with keyboard 8 and a pointing device such as mouse 9. Keyboard 8 and mouse 9 permit a user to enter commands and data into computer system 1 and to point to and to manipulate images displayed on screen 7. In alternative embodiments of the invention, only a pointing device may be provided with computer system 1, or other types of data entry devices may be utilized instead of or in addition to keyboard 8 and mouse 9.

Preferably, computer system 1 also includes hard disk 10 for storing a windowing operating system and code for a browser. Alternative storage devices may be used in conjunction with or instead of hard disk 10. Floppy disk interface 11 or a CD-ROM drive also may be included for providing removable storage for computer system 1.

Computer system 3 is depicted in FIG. 1 as a server. However, the invention may be implemented on any type of computing equipment which can provide images and other data to a browser across a network connection. Thus, while the following description of computer system 3 provides one example of a computer system which may be utilized to implement the invention, the invention is in no way limited to use of such a computer system.

Remote computer system 3 is connected to network 4 through network interface 15. Remote computer system 3 preferably includes at lease one hard disk for storing a web server, images and code according to the invention. Multiple hard disks such as hard disks 16 and 17 may be utilized to provide extensive data storage. Remote computer system 3 also may include floppy disk interface 18 or a CD-ROM drive for providing removable storage, as well as interfaces to a display, data entry devices and the like.

Remote computer system 3 preferably operates as a web server. Therefore, remote computer system 3 may operate without input devices, a display or the like, as shown. In that case, remote computer system 3 may be controlled through a network connection, for example network interface 15 or another network connection (not shown). However, the invention is equally applicable to servers that do have input devices, displays and the like attached thereto.

Figure 2:
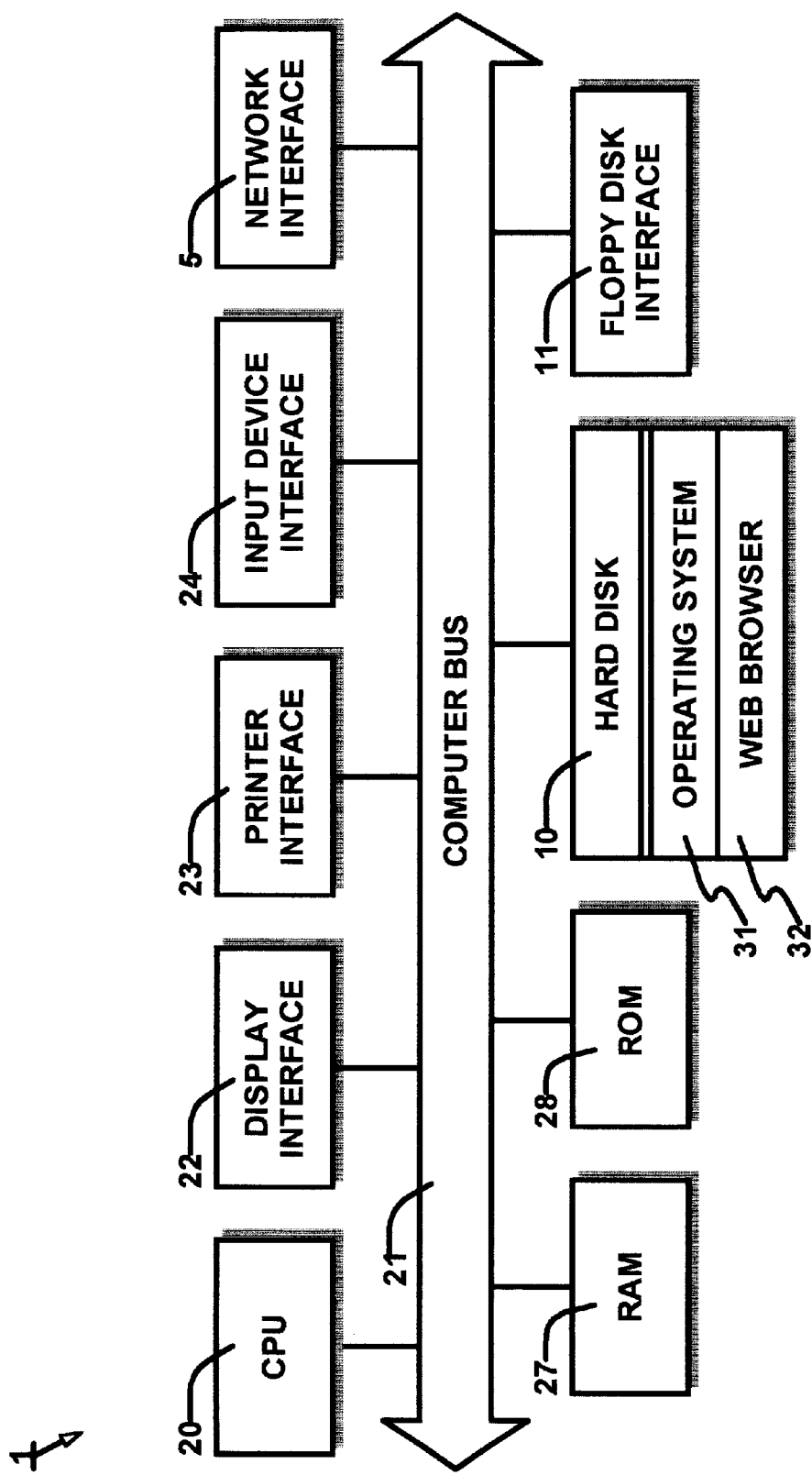
FIG. 2 is a block diagram of a computer system on which a web browser may run according to the invention.

FIG. 2 is a block diagram of computer system 1 on which a web browser may run according to the invention. As shown in FIG. 2, computer system 1 includes central processing unit (CPU) 20 interfaced to computer bus 21. Also preferably interfaced to computer bus 21 are display interface 22 for connecting to display 6, printer interface 23 for connecting to a printer (not shown), input device interface 24 for connecting to input devices such as keyboard 8 and mouse 9, and floppy disk interface 11. Network interface 5 also is interfaced to computer bus 21 so as to allow computer system 1 to communicate with network 4 such as the World Wide Web.

Random access memory (RAM) 27 interfaces to computer bus 21 so as to provide CPU 20 with memory storage. In particular, when executing stored instructions such as those associated with a web browser, CPU 20 loads those instructions into RAM 27 from hard disk 10, from floppy disk interface 11, from network 4 through network interface 5, or from some other source. The instructions are then executed by CPU 20. RAM 27 also provides storage for use by CPU 20 during the execution of the instructions.

Read only memory (ROM) 28 is provided for storing invariant instructions such as start-up instructions for basis input/output system (BIOS) sequences for operation of input devices.

As mentioned above, hard disk 10 can store instructions for execution by CPU 20. These instructions preferably include code for operating system 31 and for browser 32. Examples of a suitable operating system include, but are not limited to, Windows 95, 98 or NT, the Apple Macintosh operating system, LINUX, code to implement a Java virtual machine, and Solaris (by Sun Microsystems). Browser 32 preferably is a web browser, examples of which include, but are not limited to, Microsoft Internet Explorer and Netscape Navigator. Hard disk 10 also can provide storage for data, preferably including storage for code obtained through network interface 5 and cache storage for data which CPU 20 determines may be soon required.

Figure 3:
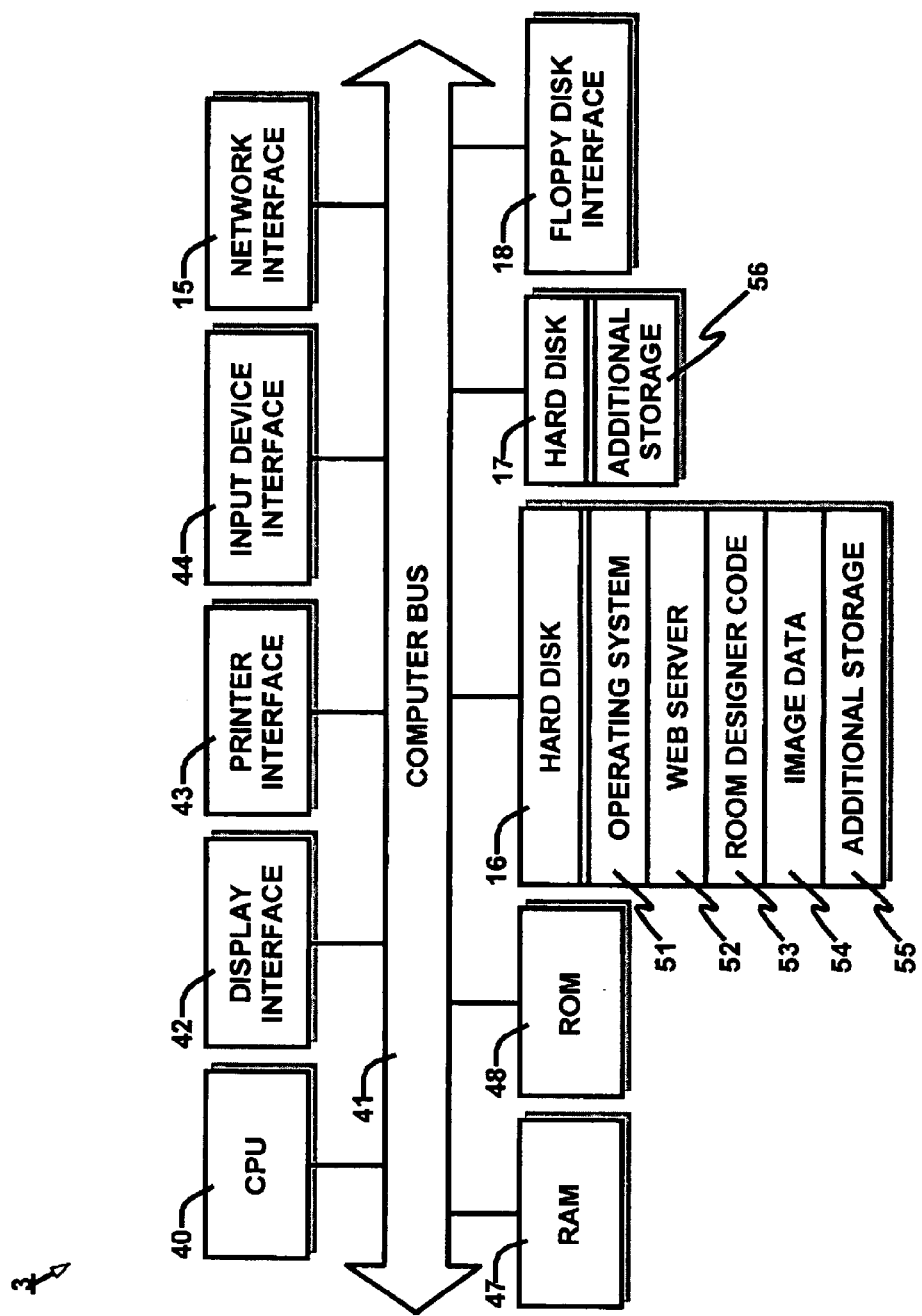
FIG. 3 is a block diagram of a remote computer system on which a web server may run according to the invention.

FIG. 3 is a block diagram of remote computer system 3 on which a web server may run according to the invention. As shown in FIG. 3, remote computer system 3 includes central processing unit (CPU) 40 interfaced to computer bus 41. Also preferably interfaced to computer bus 41 are display interface 42 for connecting to a display (not shown), printer interface 43 for connecting to a printer (not shown), input device interface 44 for connecting to input devices (not shown), and floppy disk interface 18. Network interface 15 also is interfaced to computer bus 41 so as to allow remote computer system 3 to communicate with network 4 such the World Wide Web.

Random access memory (RAM) 47 interfaces to computer bus 41 so as to provide CPU 40 with memory storage. In particular, when executing stored instructions such as those associated with a web server, CPU 40 loads those instructions into RAM 47 from hard disk 16 or 17, from floppy disk interface 18, from a network through network interface 15, or from some other source. The instructions are then executed by CPU 40. RAM 47 also provides storage for use by CPU 40 during the execution of the instructions.

Read only memory (ROM) 48 is provided for storing invariant instructions such as start-up instructions for basis input/output system (BIOS) sequences for operation of input devices.

As mentioned above, hard disks 16 and 17 can store instructions for execution by CPU 40. These instructions preferably include code for operating system 51 and web server 52, as well as room designer code 53 and image data 54 for implementing a preferred embodiment of the invention. Examples of a suitable operating system include, but are not limited to, Windows 95, 98 or NT, the Apple Macintosh operating system, LINUX, code to implement a Java virtual machine, and Solaris. Examples of suitable web servers include, but are not limited to, server products offered by Microsoft, Netscape, and Sun Microsystems. Hard disks 16 and 17 also can provide additional storage 55 and 56 for other code and data.

In the preferred embodiment, web browser 32 running on computer system 1 connects to web server 52 running on remote computer system 3 through network interface 5, network 4, and network interface 15. Web browser 32 then requests room designer code 53 from web server 52, and web server 52 provides room designer code 53 to web browser 32. Computer system 1 then executes room designer code 53 so as to implement a room designer according to the invention. The room designer is explained in detail below. While implementing the room designer, web browser 32 may request various portions of image data 54 from web server 52, also as explained below.

Again, the foregoing descriptions of computer system 1 and computer system 3 are provided for illustrative purposes only. The invention is in no way limited to the foregoing computer system architectures. For example, room designer code 53 may be resident on computer system 1, in which case only image data 54 is sent from remote computer system 3 to computer system 1 while implementing the room designer. Likewise, the architectures of computer systems 1 and 3 may be entirely different from those set forth above. In particular, any computing equipment capable of sending image data across a network connection may be utilized to implement the invention.

User Interface

Figure 4:
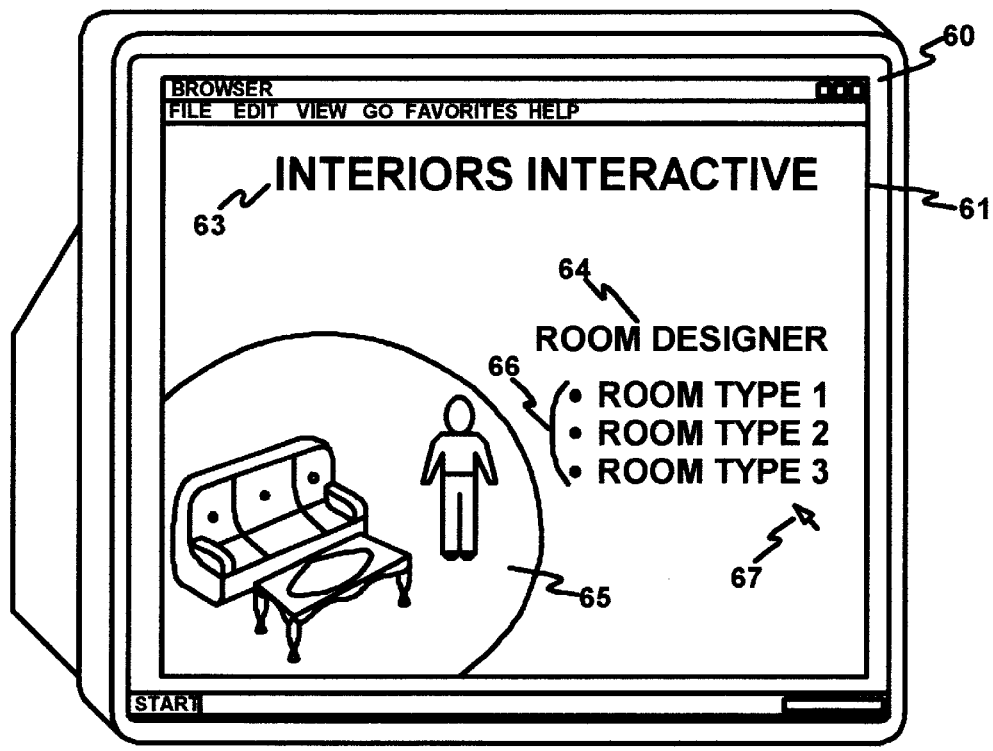
FIG. 4 is a representational view which shows a general layout of one possible start page for a room designer according to the invention.

FIG. 4 is a representational view which shows a general layout of one possible start page for a room designer according to the invention. Shown in FIG. 4 is browser window 61 displayed on screen 60. In one embodiment of the invention, screen 61 is screen 7 of computer system 1, and browser window 61 is generated by web browser 32. In that embodiment, browser window 61 accesses and displays images in accordance with code and data provided by a web server such as web server 52 running on remote computer system 3.

In FIG. 4, browser window 61 has been directed toward a site which provides code and data for a room designer according to the invention. Thus, the start page shown in FIG. 4 preferably includes name 63 of the company responsible for the site, here Interiors Interactive. Of course, the site could be maintained by another company, and the name of that company need not be displayed.

Also preferably included in the start page shown in FIG. 4 is label 64 and image area 65. Label 64 identifies that the site provides a "Room Designer." Image area 65 shows substantially photorealistic examples of room furnishings that can be rendered by the room designer according to the invention. In the example shown in FIG. 4, image area 65 also includes a substantially photorealistic image of a person. The invention may generate such images so as to aid a user in viewing how a person might interact with the room furnishings. Nonetheless, for the sake of simplicity, the following discussion is limited to images of furnishings such as furniture. Other types of furnishings that can be included in a room designed according to the invention include, but are not limited to, rugs, draperies, wall paper and the like.

Preferably, substantially photorealistic images produced by the browser are high-resolution color images, although lower resolution black and white images may be utilized. In any event, the images should provide a reasonable approximation of the real-world look of the furnishings.

Of course, the black and white drawing for FIG. 4 is not substantially photorealistic. Rather, a representational view is provided to simulate a substantially photorealistic image. Throughout this application, drawings which are intended to represent substantially photorealistic images will be described as such, and more detail will be provided in those drawings. The other type of images described in this application are simplified images. Such images will be shown as very simple stick figures in the drawings. The simplified images also will be described as such in the corresponding text of this application. In actuality, the representational views used to simulate substantially photorealistic images in the drawing figures tend to be closer to the simplified images utilized by the invention.

Room type choices 66 preferably are displayed beneath label 64. An input device such as mouse 9 is used to select one of the room type choices with cursor 67. In response, the room designer according to the invention preferably is initialized for designing the selected type of room with corresponding types of furnishings.

Figure 5:
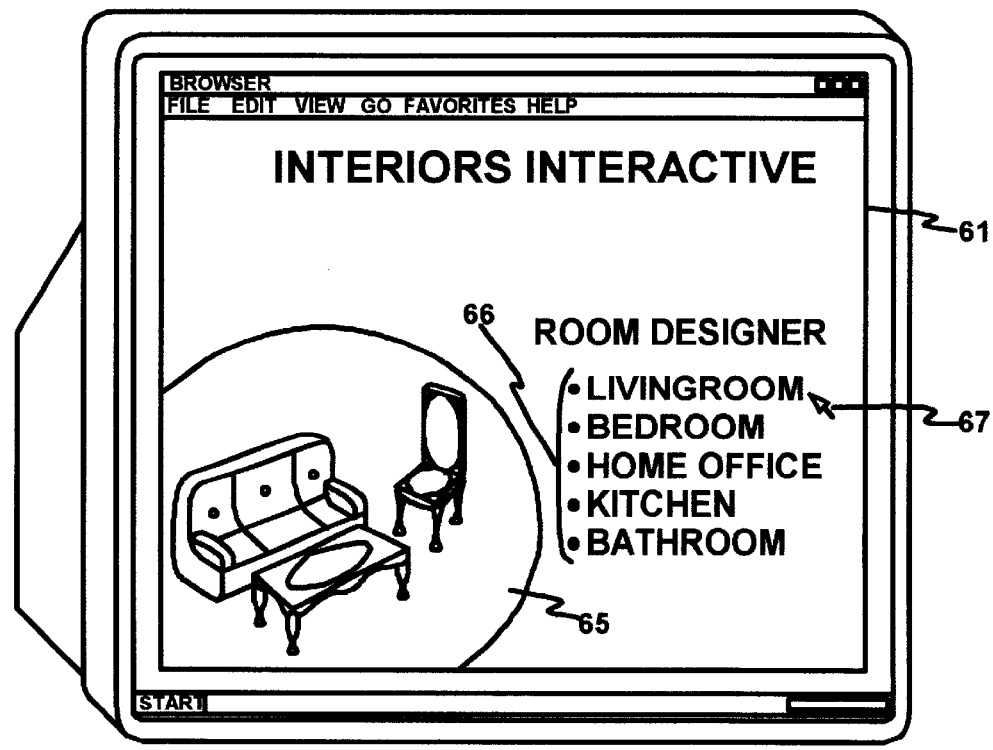
FIG. 5 is a representational view which shows one embodiment of the start page shown in FIG. 4.

FIG. 5 is a representational view which shows one embodiment of the start page shown in FIG. 4. Thus, browser window 61 in FIG. 5 is arranged substantially as in FIG. 4. The primary difference is that room type choices 66 include actual room types, namely choices for a livingroom, bedroom, home office, kitchen and bathroom. Another difference is that image area 65 includes a substantially photorealistic image of a chair instead of an image of a person.

Figure 6:
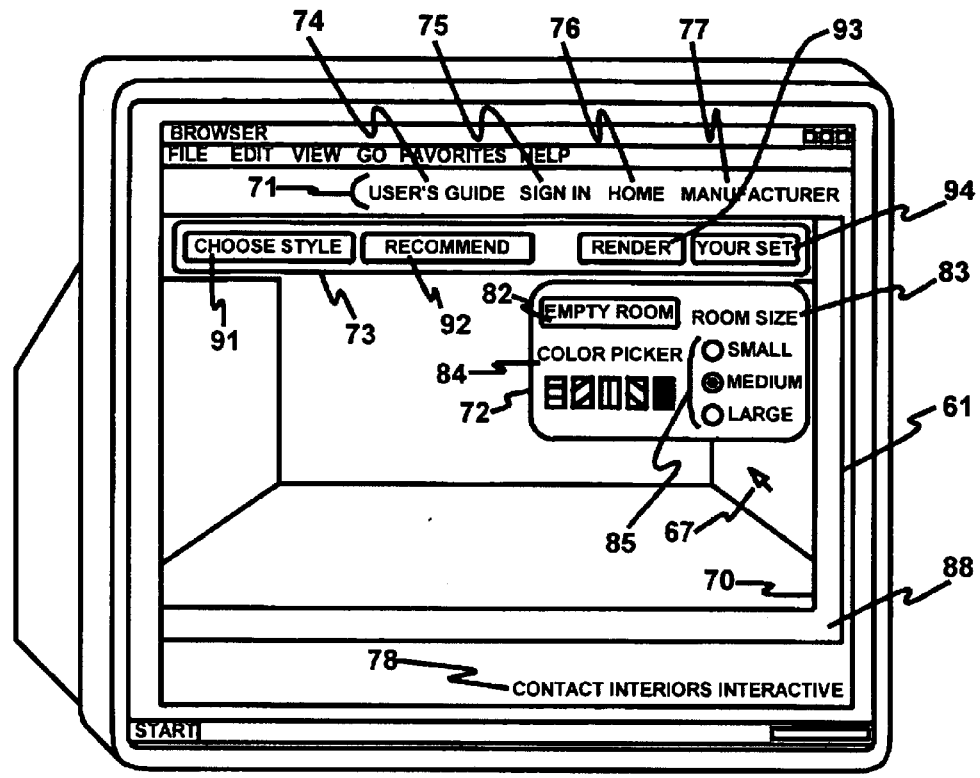
FIG. 6 is a representational view which shows one embodiment of a room designer according to the invention.

Once a room type is selected, browser window 61 preferably changes so as to present tools for a room designer according to the invention, as shown in FIG. 6.

FIG. 6 is a representational view which shows one embodiment of a room designer according to the invention. As shown in FIG. 6, browser window 61 preferably includes at least perspective view 70 of a room, navigation area 71, room attributes box 72, and furnishings tool bar 73.

Perspective view 70 may be a three dimensional view of the room, a so-called two-and-a-half dimensional view of the room, or any other view which provides a user with a simulation of real-world depth. Many different types of perspective views are well-known in the art, and the invention may use any of them.

Navigation area 71 preferably is provided for navigating through the web site for the room designer. Using cursor 67, a user can select user's guide hyperlink 74, sign in hyper link 75, home page hyperlink 76, [and] manufacturer hyperlink 77, and designer hyperlink 78.

User's guide hyperlink 74 provides access to a user's guide for the room designer. Sign in hyperlink 75 allows a user to sign in, thereby informing the web site of the user's identity. Home page hyperlink 76 provides access to the web site's home page, for example the start page shown in FIGS. 4 and 5. Manufacturer hyperlink 77 provides access to one or more web sites of manufacturers of furnishings showcased by the room designer. An additional hyperlink 78 can provide access to the designer of the room designer, for example Interiors Interactive, Inc.

Room attributes box 72 preferably is provided for setting attributes of the room displayed in browser window 61. Using cursor 67, a user can select empty room button 82, room size area 83, and color picker area 84. When selected, empty room button 82 empties the modeled room of all furnishings.

Room size area 83 includes room size buttons 85. These buttons allow a user to select one of plural room sizes. In addition, one of the room sizes may be preselected as a default in accordance with the room type. In FIG. 6, a medium room size has been selected. Accordingly, browser window 61 depicts a medium sized room.

In one embodiment of the invention, neither a small sized room nor a medium sized room occupies all available area in browser window 61. As a result, blank border 88 may be displayed outside of perspective view 70. This border is larger for a small sized room and smaller for a medium sized room. Preferably, the border is nonexistent for large sized room.

Color picker area 84 preferably allows a user to pick a base color for the room. This base color preferably is then used to color the walls of the room shown in perspective view 70. In addition, different shades of the selected color may be used to color the floor and/or ceiling of the room.

Furnishings tool bar 73 allows a user to insert furnishings having various properties into the room modeled by the room designer. To this end, furnishings tool bar 73 preferably includes style button 91, recommend button 92, render button 93 and your set button 94. The operation of each of these buttons is explained in more detail below.

Figure 7:
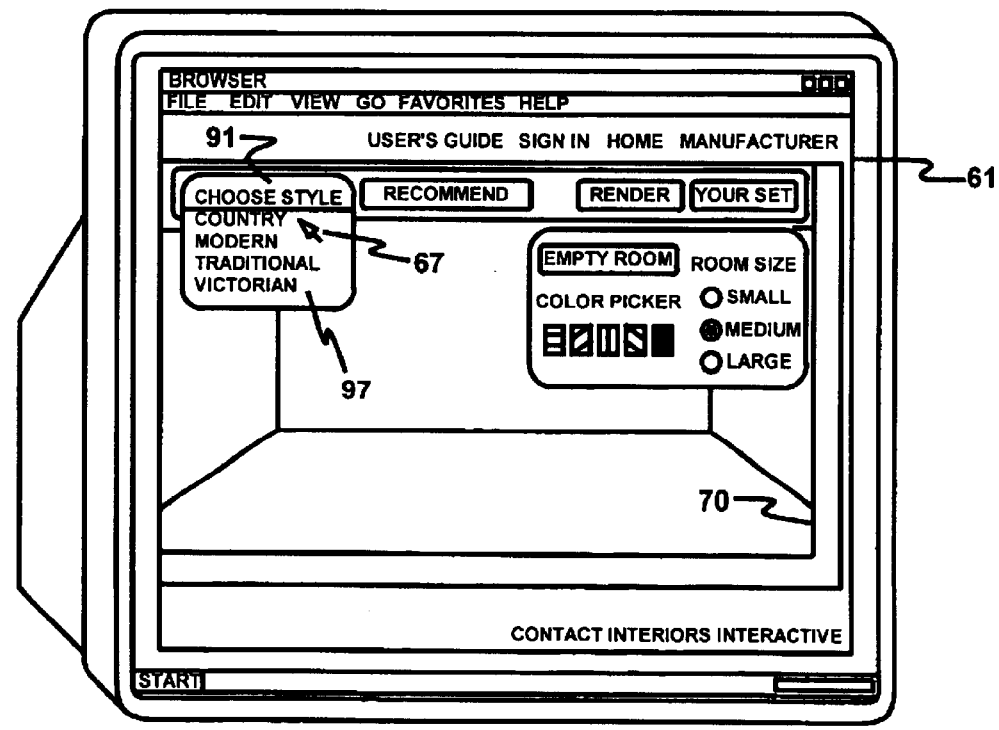
FIG. 7 is a representational view which shows selection of a style for a furnishing to be modeled in a perspective view of a room according to the invention.

FIG. 7 is a representational view which shows selection of a style for furnishings to be displayed in perspective view 70 according to the invention. In the preferred embodiment, cursor 67 is used to select style button 91, resulting in the display of pull-down menu 97. One of plural styles of furnishings is then selected from the pull down menu using cursor 67. Once a style of furnishings has been selected, the user can specify a furnishing of that style to be added to perspective view 70.

Figure 8:
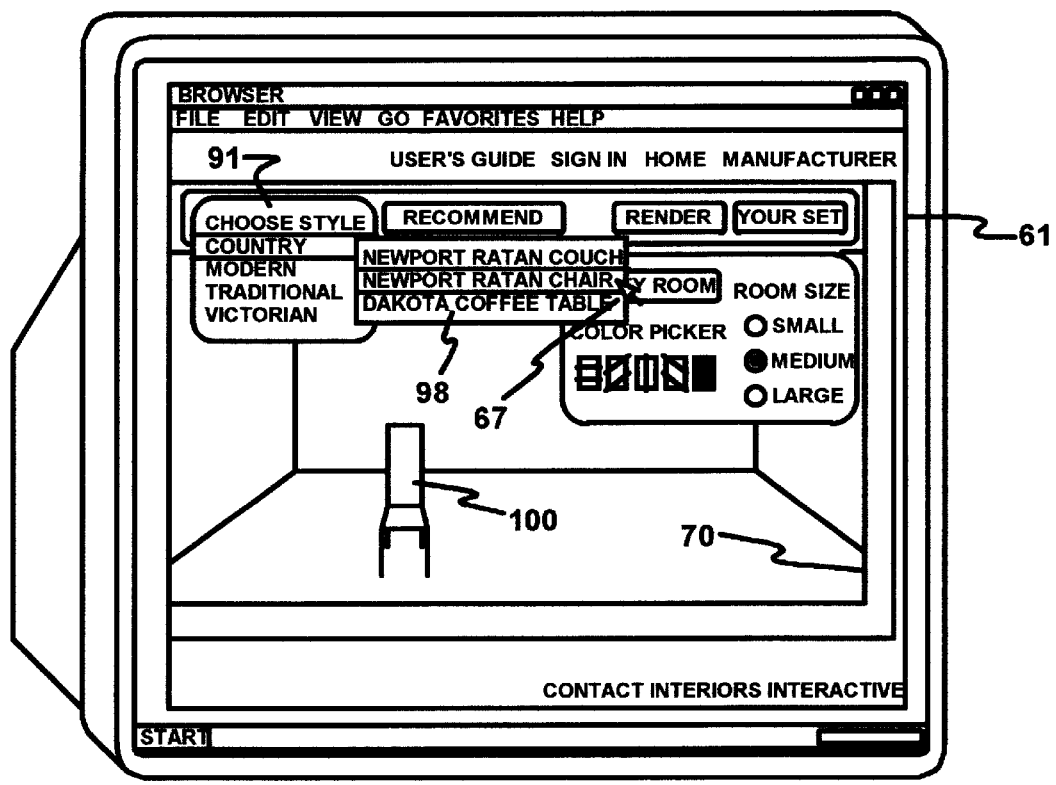
FIG. 8 is a representational view which shows specification of a furnishing to be modeled in a perspective view of a room according to the invention.

FIG. 8 is a representational view which shows specification of a furnishing to be added to a perspective view of a room according to the invention. In FIG. 8, cursor 67 has been used to select a "country" style for the furnishing. As a result, browser window 61 has displayed list box 98 of various furnishings in the country style. In FIG. 8, the listed furnishings are items of furniture. However, other types of furnishings also can be listed in the list box.

When cursor 67 is used to select one of the listed furnishings, a simplified image of that furnishing is inserted into perspective view 70. Thus, in FIG. 8, cursor 67 has been used to select a "Newport Ratan Chair," and simplified image 100 of the chair has been inserted into perspective view 70.

Simplified image 100 is a simplified image that corresponds to the specified furnishing. Preferably, the simplified image is a wire-frame image. Other types of simplified images, such as very low resolution color or black and white images, may be utilized. The primary criteria for the image it that the image can be obtained relatively quickly by a browser from a web server across even a slow connection (e.g., 56 k baud).

Figure 9:
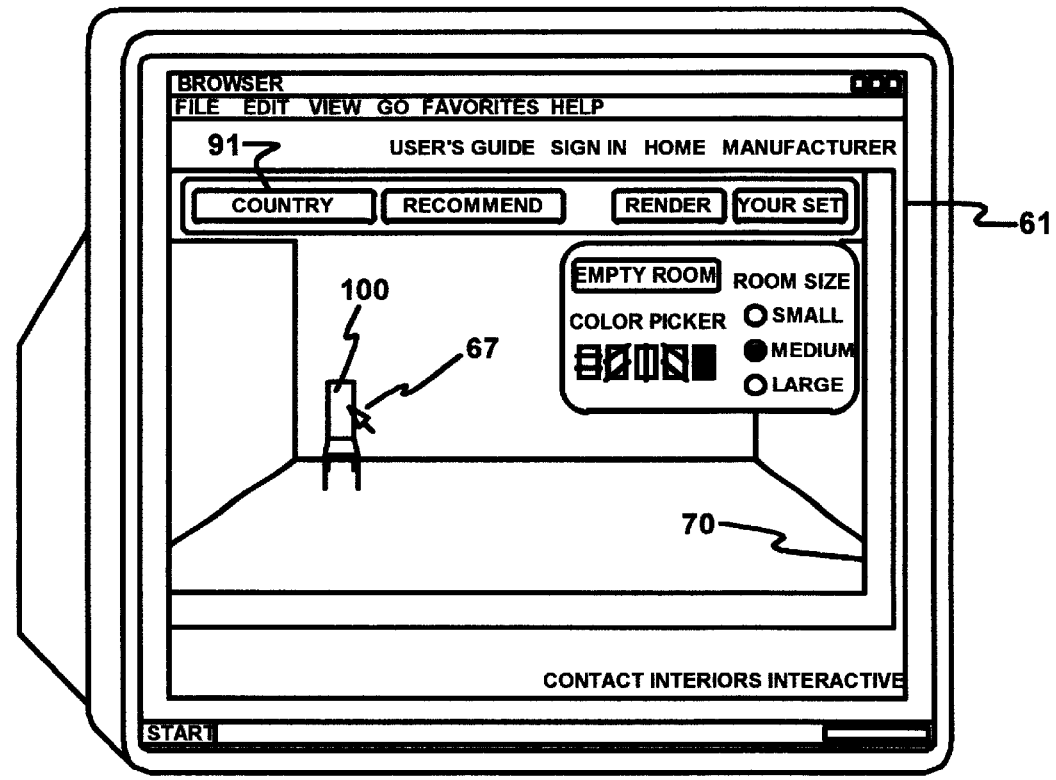
FIG. 9 is a representational view which shows manipulation of a simplified image of a furnishing according to the invention.

FIG. 9 is a representational view which shows manipulation of a simplified image of a furnishing according to the invention. In FIG. 9, simplified image 100 of the furnishing has been selected with cursor 67. Then, the cursor has been moved toward the top of browser window 61, which represents moving the image toward the back of perspective view 70 of the room. Preferably, simplified image 100 is scaled as it is moved back and forth in perspective view 70, thereby maintaining the perspective of the view. A logarithmic scaling factor preferably is used.

In the preferred embodiment, when a simplified image is selected with cursor 67, the style of the furnishing represented by that image is displayed by style button 91. Alternatively, style button 91 can display the style of the last inserted furnishing.

Figure 10:
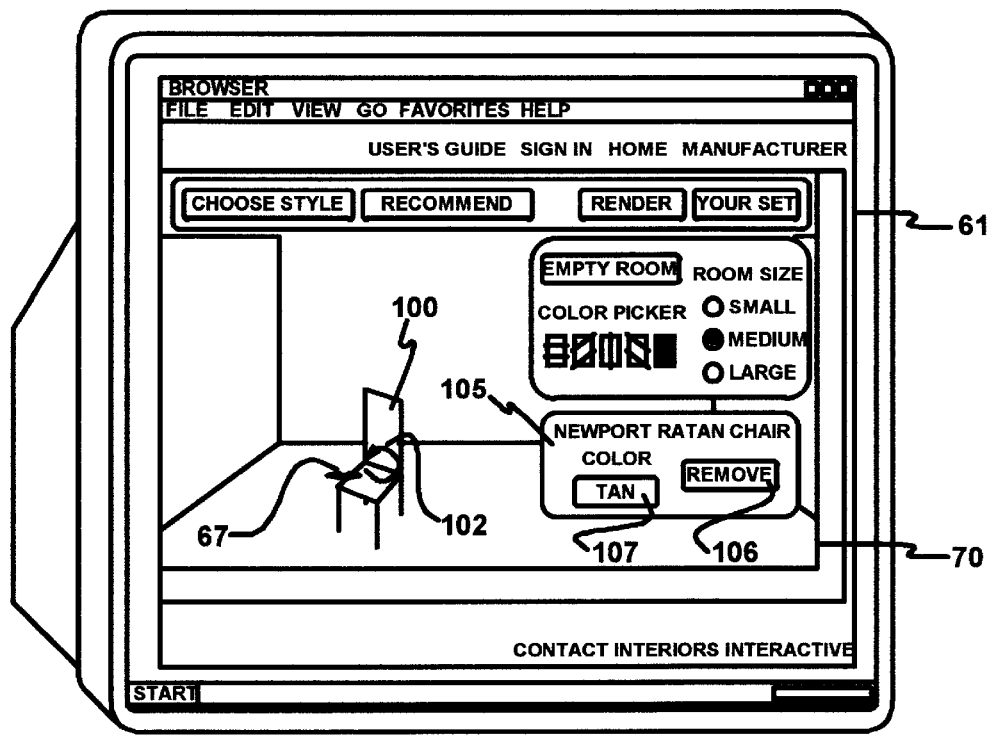
FIG. 10 is a representational view which shows rotation of a simplified image of a furnishing according to the invention, along with specification of a color for the furnishing.

FIG. 10 is a representational view which shows rotation of a simplified image of a furnishing according to the invention, along with specification of a color for the furnishing.

According to the preferred embodiment of the invention, when cursor 67 is used to select a simplified image without moving the image, rotation symbol 102 is superimposed on the image. At the same time, cursor 67 changes form so as to indicate that a rotation operation has been initialized. Then, as cursor 67 is moved left and right, the simplified image changed to show rotation of the furnishing. When the user is satisfied with the rotation, the user can deselect the simplified image, for example through use of a mouse button or through hitting a particular key (e.g., Esc) on a keyboard. FIG. 9 illustrates simplified image 100 changed so as to show approximately thirty degrees of rotation.

When a simplified image is selected, properties window 105 preferably also is displayed in browser window 61. The properties window preferably includes at least remove button 106 and color button 107. Selection of remove button 106 removes the selected simplified image from perspective view 70. Color button 107 is used to specify a color for the furnishing represented by the selected simplified image.

Figure 11:
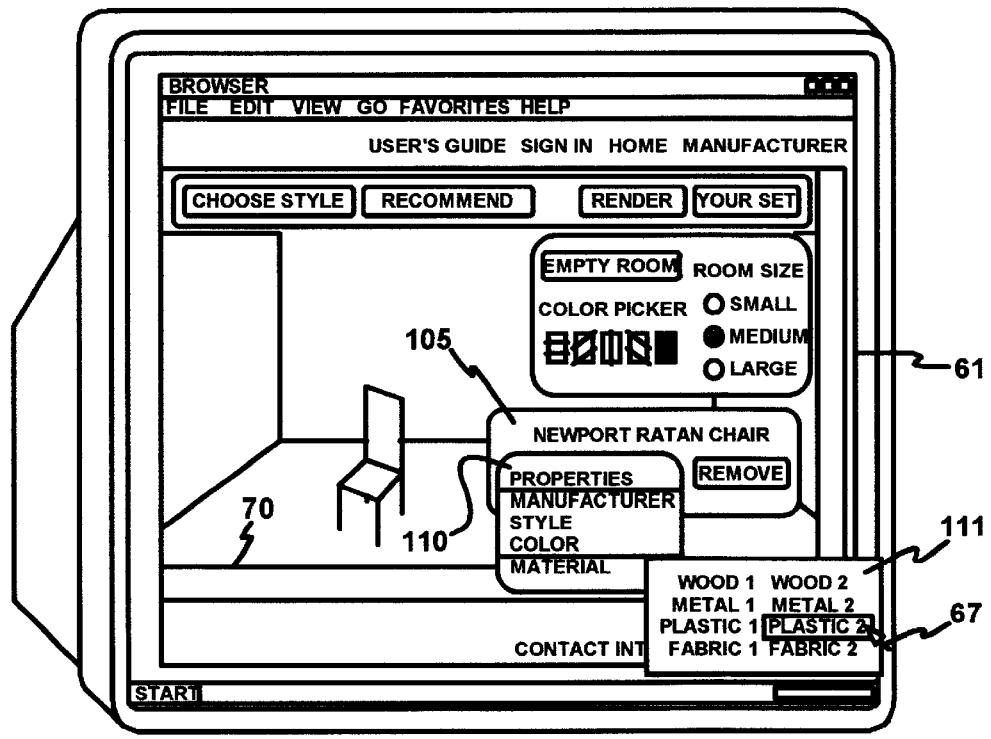
FIG. 11 is a representational view which shows specification of properties for a furnishing according to the invention.

FIG. 11 is a representational view which shows specification of properties for a furnishing according to the invention. In FIG. 11, properties window 105 allows specification of more elaborate properties for a furnishing than just color. These properties preferably include a manufacturer, a style, a color and a material for the furnishing. Selection of any of these properties with cursor 67 preferably results in display of a list box such as materials list box 111. These list boxes allow a user to select from a wide range of furnishing properties.

Specification of multiple furnishings, manipulation of the placement and orientation for all of those furnishings, and specification of properties for those furnishings may be a time consuming task. In addition, a manufacturer may have pre-designed arrangements of furnishings that they wish to showcase. Accordingly, the preferred embodiment of the invention allows the user to request a recommended furnishings layout.

Figure 12:
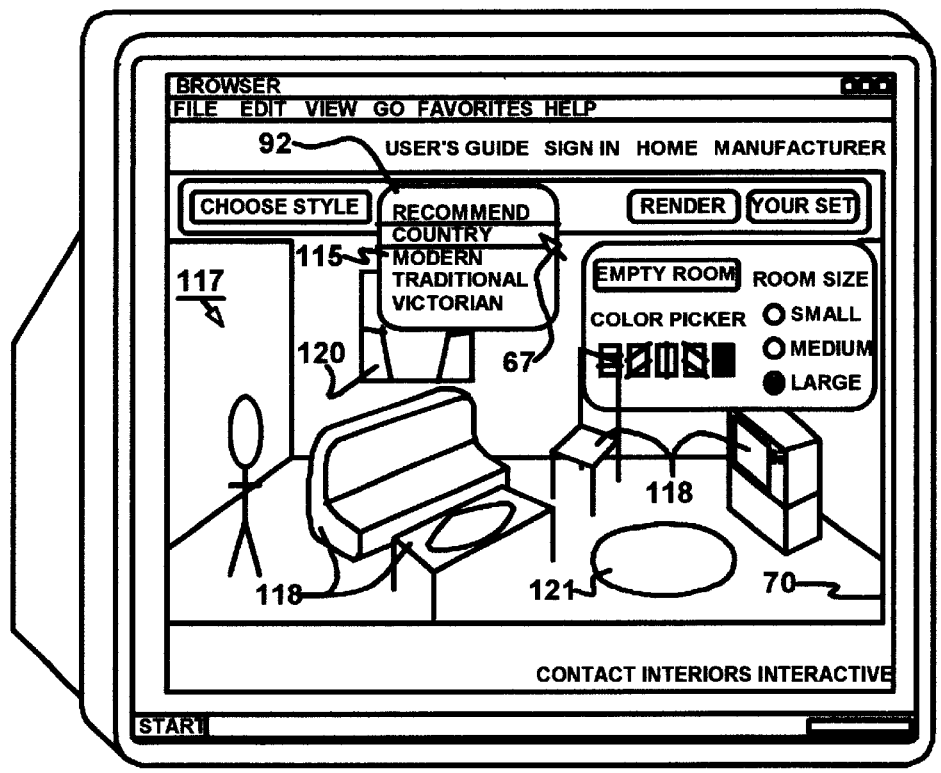
FIG. 12 is a representational view which shows recommendation of a group of furnishings for designing a room according to the invention.

FIG. 12 is a representational view which shows recommendation of a group of furnishings for designing a room according to the invention. In FIG. 12, cursor 67 has been used to select recommend button 92. As a result, browser window 61 displays recommendation options pull-down menu 115. These option may included labels representing different styles of furnishings, different manufacturers of furnishings, or any other collections of furnishings. When the user selects one of the recommendation options, simplified images of a corresponding group of furnishings at predefined locations and orientation are inserted into perspective view 70. Preferably, predefined properties are assigned to the inserted furnishings.

In FIG. 12, a recommendation for a country style of furnishings has been selected. As a result, simplified images of a group of country style furnishings 117 are displayed in perspective view 70. These images include images of furniture 118, draperies 120 and rug 121. Other types of furnishings may be included in a recommended group of furnishings.

After the user has requested a recommendation of furnishings for a room, the user preferably can add or remove furnishings and manipulate and modify the properties of the furnishings, as discussed above with reference to FIGS. 4 to 11.

Once a user is satisfied with the furnishings shown as simplified images in perspective view 70 and with the properties for those furnishings, the user may desire to see the furnishings rendered with substantially photorealistic images. This rendering assists the user in seeing how the furnishings will look together in the real world.

Figure 13:
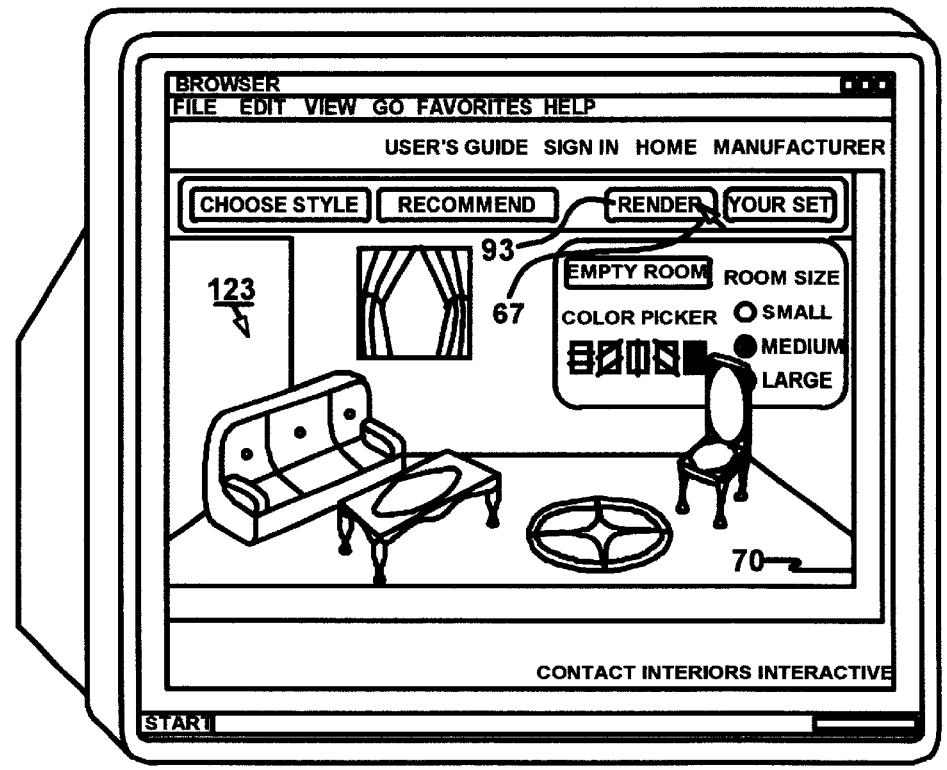
FIG. 13 is a representational view which shows rendering of a room with substantially photorealistic perspective images of furnishings according to the invention.

FIG. 13 is a representational view which shows rendering of a room with substantially photorealistic perspective images of furnishings according to the invention. The furnishings depicted in FIG. 13 correspond to the furnishings depicted in FIG. 12, except that the image of the person has been removed and images of some of the furnishings have been manipulated before selection of render button 93. Upon selection of render button 93, simplified images in perspective view 70 have been replaced with substantially photorealistic perspective images 123. Because these substantially photographic realistic images are rendered with fixed locations, orientations and properties, the rendering operation can be preformed relatively quickly.

Once the furnishings have been rendered, render button 93 can be selected again so as to return to the simplified images of the furnishings. Then, the simplified images can be further manipulated, furnishings can be added or removed, and properties for the furnishings can be changed. The rendering and modification process can be repeated until a satisfactory arrangement of furnishings is achieved.

Figure 14:
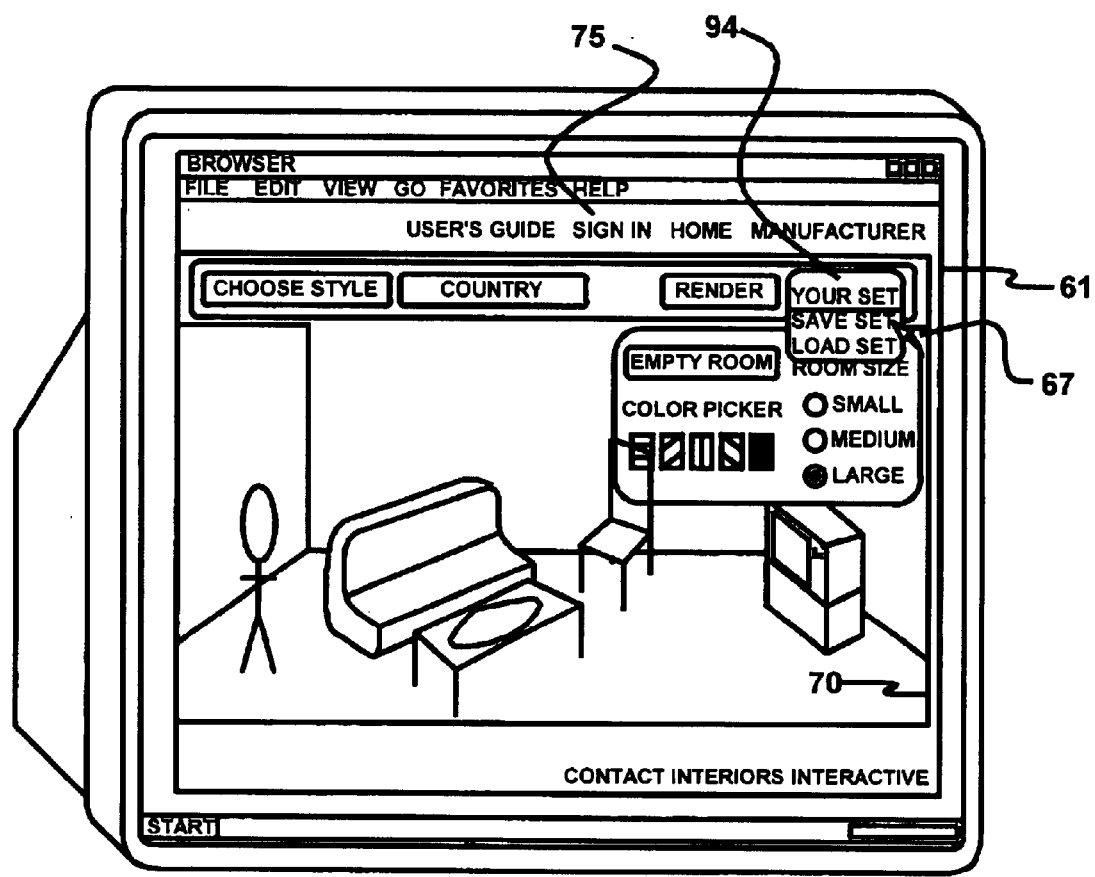
FIG. 14 is a representational view which shows loading and saving of a designed room according to the invention.

FIG. 14 is a representational view which shows loading and saving of a designed room according to the invention. When selected with cursor 67, your set button 94 allows a user to save or to load a designed room, including selection, position, orientation and properties for furnishings in the room. Preferably, the load/save feature operates in conjunction with sign in hyperlink 75 so as to associate automatically the designed room with a current user.

User Operation

Figure 15:
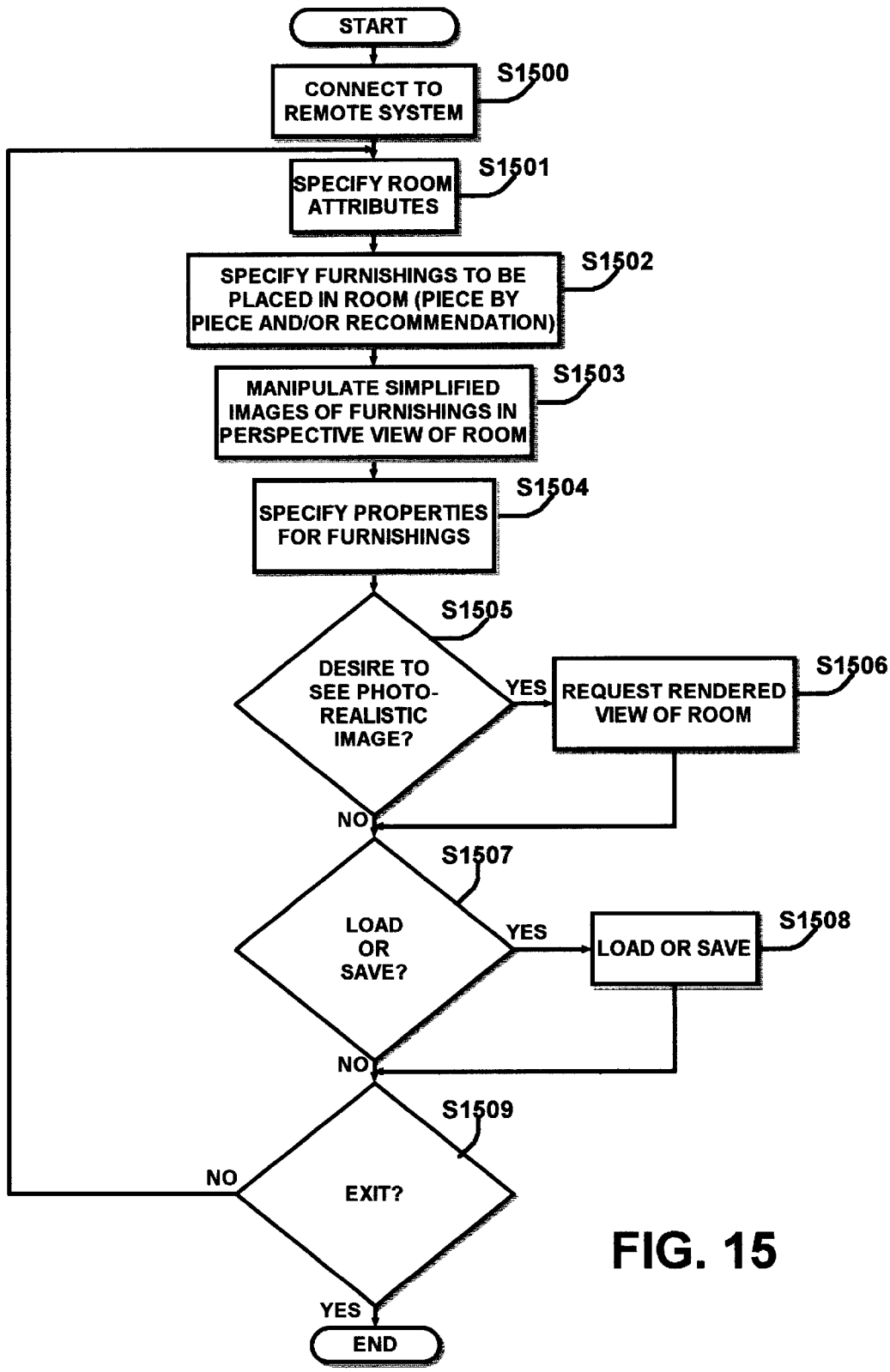
FIG. 15 is a flow chart for explaining generation of a photorealistic perspective view of a designed room with user specified furnishings according to the invention, from a user's point of view.

FIG. 15 is a flow chart for explaining generation of a photorealistic perspective view of a designed room with user specified furnishings according to the invention, from a user's point of view. While the steps in FIG. 15 are shown in what is believed to be a particularly useful order, it is entirely possible for the steps to be executed in many different orders without departing from the invention.

Briefly, a user specifies individual furnishings to be displayed in a perspective view of the room. The user independently manipulates simplified images of the individual furnishings in the perspective view of the room. The user also preferably specifies independent properties for the individual furnishing. When the user is satisfied with the arrangement and properties for the furnishings, the user instructs the browser to render the room with substantially photorealistic perspective images of the individual furnishings in the perspective view of the room. The substantially photorealistic perspective images are obtained from the remote system.

In more detail, the user in step S1500 instructs a browser such as browser 32 to connect to a site which provides a room designer according to the invention. In response, the browser displays a start page such as the start page shown in FIGS. 4 and 5.

In step S1501, the user specifies attributes for a room. For example, the user specifies a room type from room type options 66 shown in FIGS. 4 and 5. The browser then shows a perspective view of a room, for example as shown in FIG. 6. The user preferably can specify further attributes for the room, for example using room attributes box 72 shown in FIG. 6.

Then, in step S1502, the user specifies furnishings to be shown in the perspective view of the room. The furnishings can be specified individually as described above with respect to FIG. 8. Preferably, a group of recommended furnishings also can be requested, as described above with reference to FIG. 12. In response, the browser displays simplified images of the furnishings in the perspective view. These images are obtained by the browser from a remote system.

The user can independently manipulate the simplified images in step S 1503. In this context, the term "independent" means independent of manipulation of other images of furnishings in the room. For example, the user can change the positions and orientations of each of the simplified images as discussed above with respect to FIGS. 9 and 10.

Manipulation of a group of images of furnishings, for example selecting and moving two images at once, is compatible with the invention. However, according to the invention, at least some of the images of the furnishings can be manipulated independently. Likewise, in the case that the user requests a recommended group of furnishings in step S1502, the user preferably can manipulate individual ones of the images of the recommended furnishings in step S1503.

In step S1504, the user can specify independent properties for the furnishings. In this context, the term "independent" means that the properties do not have to be related to properties for other furnishings in the room. In particular, the user preferably can assign each furnishing its own independent properties. Examples of specifying properties for furnishings are discussed above with respect to FIGS. 10 and 11.

Specification of group properties, for example setting all furnishings to a particular color scheme, is compatible with the invention. However, according to the invention, the properties for at least some of the furnishings can be specified independently. Likewise, in the case that the user requests a recommended group of furnishings in step S1502, the user preferably can change the properties of individual ones of the recommended furnishings in step S1504.

If the user in step S1505 desires to see a rendered view of the designed room that includes substantially photorealistic perspective images of the furnishings arranged and oriented according to the foregoing steps, flow proceeds to step S1506. In step S1506, the user requests such an image. For example, as shown in FIG. 13, the user selects render button 93. In response, the browser renders the room with substantially photorealistic perspective images of furnishings according to the positions and orientations of the corresponding simplified images and in accordance with the specified properties for the furnishings. Preferably, the room also is rendered in accordance with any specified attributes for the room.

If the user desires to save the current room design, or to load a previously saved room design, flow proceeds from step S1507 to S1508. In step S1508, a room design can be loaded or saved, preferably in accordance with sing-in information provided by the user.

The foregoing steps can be repeated until the user desires to exit the room designer in step S1509.

Browser Operation

Figure 16:
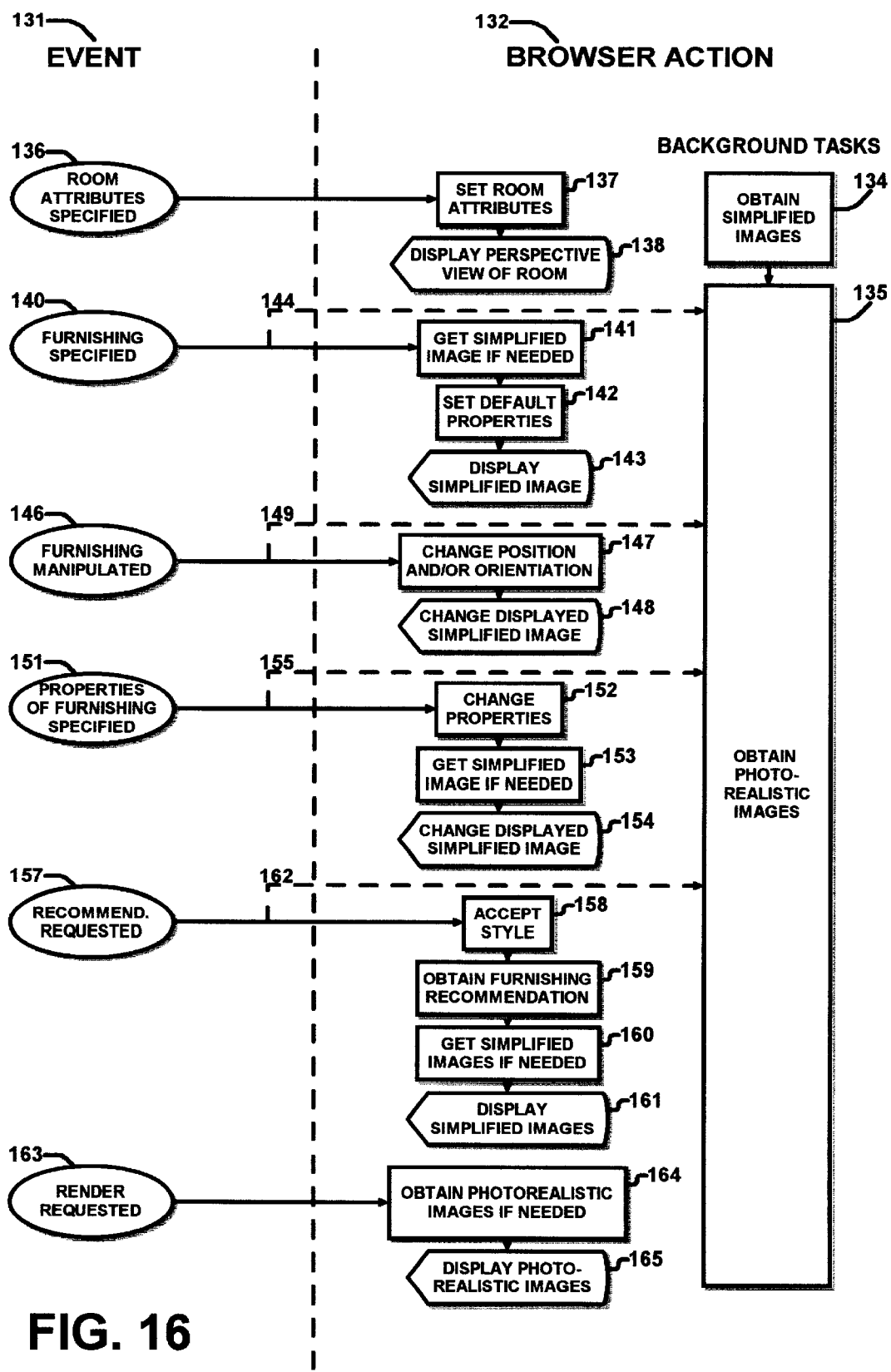
FIG. 16 is a flow diagram for explaining operation of a browser during generation of a photorealistic perspective view of a designed room according to the invention.

FIG. 16 is a flow diagram for explaining operation of a browser during generation of a photorealistic perspective view of a designed room according to the invention. Preferably, the operations illustrated in FIG. 16 are performed by a browser such as web browser 32 in accordance with code such as room designer code 53 obtained from a remote system.

Briefly, a browser connected to a system remote to the browser allows a user to design a room by performing at least the following steps: The browser displays a perspective view of the room and accepts specification of individual furnishings to be added to the room. The browser preferably also accepts specification of attributes for the room. The browser displays simplified images of the individual furnishings in the perspective view of the room. Preferably, the simplified images are obtained from the remote system. The browser accepts and displays independent manipulation of the simplified images of the individual furnishings in the perspective view of the room. Preferably, the browser also accepts and displays specification of a recommended group of furnishings and specification of independent properties for the furnishings. The simplified images are displayed also in accordance with the specification of independent properties. Upon user request, the browser renders the room with substantially photorealistic perspective images of the furnishings in the perspective view of the room. The substantially photorealistic perspective images are obtained from the remote system. The browser preferably obtains at least part of the substantially photorealistic perspective images from the remote system while the independent properties are being specified. The browser renders the room in accordance with the independent manipulation of the simplified images, and preferably in accordance with the specification of independent properties, so as to present corresponding perspective views of the furnishings.

In more detail, the operation of the browser according to the preferred embodiment of the invention is event driven. Thus, FIG. 16 is divided into events 131 on the left and browser action 132 on the right. These events may occur in many different orders without departing from the invention.

After the browser connects to a remote site and obtains code for implementing the room designer according to the invention, the browser in block 134 preferably begins to obtain simplifies images of furnishings. The operation of block 134 preferably runs as a background task until complete. Alternatively, the browser may wait for block 134 to complete before responding to external events.

In any case, once block 134 is complete, the browser preferably begins in block 135 to obtain substantially photorealistic perspective images of furnishings. This block preferably is relegated to a background task so as to allow a user to begin to design of a room without having to wait for the photorealistic figures to load. Thus, the browser responds to external events while obtaining the substantially photorealistic perspective images.

In response to "room attributes specified" event 136, the browser in block 137 sets room attributes. Then, in block 138, the browser displays a perspective view of a room corresponding to those attributes.

In response to "furnishing specified" event 140, the browser in block 141 obtains a simplified image for the furnishing. If the simplified image has already been obtained by the browser in block 134, that image is utilized. Otherwise, the browser obtains the simplified image from the remote system. Because the browser is obtaining a simplified image, little delay should result from execution of block 141 even if an image must be obtained. In contrast, if a substantially photorealistic image of the furnishing had to be obtained, significant and unacceptable delay might be necessary in order to obtain the image.

Default properties for the furnishing preferably are set in block 142, and the simplified image is displayed in block 143.

Broken line 144 indicates that upon specification of a furnishing, the browser preferably causes background task 135 to begin to obtain corresponding substantially photorealistic perspective images of the furnishing. These photorealistic images preferably are stored in a cache for rapid access by the browser. The first such image preferably corresponds to an un-scaled and un-rotated photorealistic image of the furnishing.

As a result of this caching operation, at least part of the required substantially photorealistic perspective images for rendering a room can be acquired during idle time for the browser. For example, at least part of the substantially photorealistic perspective images can be obtained from the remote system while simplified images of the furnishings are being manipulated and while properties for the furnishings are being specified. This operation tends to reduce delays that might otherwise occur during the render operation discussed below.

In response to "furnishing manipulated" event 146, the browser in block 147 changes the position and/or orientation of the simplified image of the manipulated furnishing. Block 147 preferably involves scaling and/or rotating the simplified image. In block 147, at least some of the images of the furnishings can be manipulated independently of other images of the furnishings.

Because a simplified image is being scaled, the image can be scaled quickly. For example, the preferred logarithmic scaling operation can be performed quickly on simple image.

Simplified images also can be rotated quickly. For example, in one preferred embodiment of the invention, simplified images of a furnishing are stored in an animation of the furnishing being rotated. Any particular simplified image of the furnishing is a stopped frame in this animation. Thus, when a user selects and rotates a simplified image of a furnishing, stop frame animation is performed wherein the animation is stepped forward or backward as appropriate.

Very efficient tools exist for performing such stop frame animation of simple images. For example, the preferred embodiment of the invention utilizes the Shockwave plug-in to perform the animation. Of course, such animation with substantially photorealistic images would not be as efficient and may result in an unacceptably slow rotation operation.

In block 148, the modified simplified image is displayed. In addition, broken line 149 indicates that the browser preferably causes background task 135 to begin to acquire substantially photorealistic perspective images that correspond to the manipulation of the simplified image.

In response to "properties of furnishing specified" event 151, the browser in block 152 changes the properties for the corresponding furnishing. Preferably, properties for at least some of the furnishings can be changed independently of properties for other furnishings in the room.

In the preferred embodiment of the invention, changes to the properties for a furnishing may be reflected in the corresponding simplified image for that furnishing. If the changes are reflected in the simplified image, a modified simplified image may be obtained in block 153 if necessary. In block 154, the modified image is displayed. Preferably, background task 135 also begins to obtain a corresponding substantially photorealistic perspective image, as indicated by broken line 155.

In response to "recommendation requested" event 157, the browser in block 158 accepts a style or other information describing the type of requested furnishings. In block 159, the corresponding furnishing recommendation is obtained from the remote system. Any needed simplified images are obtained in block 160, and the simplified images are displayed in block 161. Background task 135 preferably begins to acquire the corresponding substantially photorealistic perspective images, as indicated by broken line 162.

In response to "render requested" event 163, the browser renders the specified furnishings in accordance with previous events. In block 164, the browser obtains any needed substantially photorealistic perspective images that have not been obtained by background task 135. Then, the images are displayed in block 165 in the perspective view of the room. Preferably, the browser suspends responses to events that would change the appearances of the images of the furnishings.

If "render requested" event 163 occurs while the room is already rendered, the browser removes the rendered images and redisplays the simplified images. Then, the browser again responds to events that change the appearances of the images of the furnishings.

Server Set-Up

Figure 17:
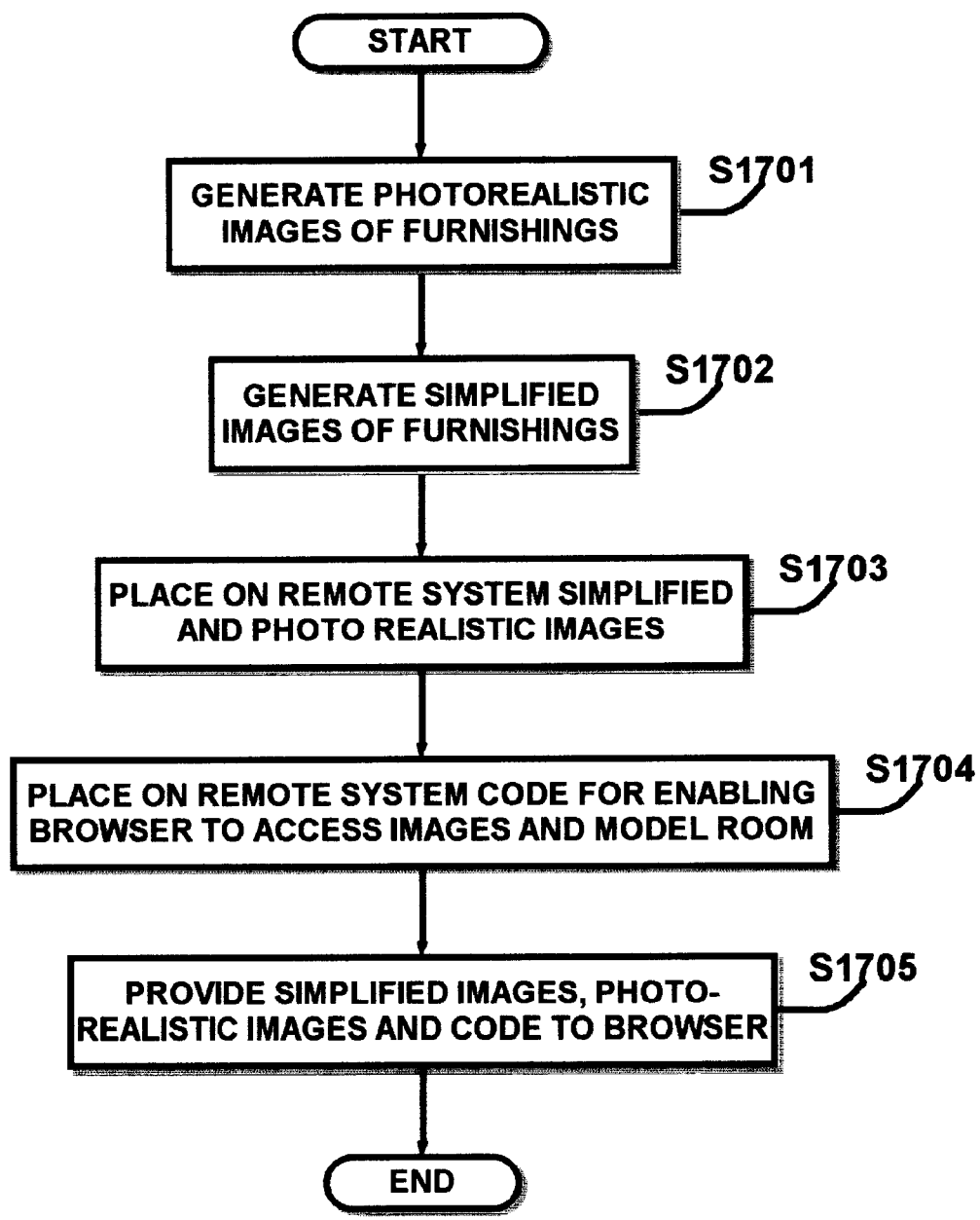
FIG. 17 is a flowchart for explaining set-up of a remote system which allows a connected browser to design a room according to the invention.

FIG. 17 is a flowchart for explaining set-up of a remote system which allows a connected browser to design a room according to the invention.

Briefly, rotatable and scalable substantially photorealistic perspective images of different types of furnishings are generated. The substantially photorealistic perspective images for each different type of furnishing differ according to properties for that type of furnishing. Rotatable and scalable simplified images of the different types of furnishings also are generated. The substantially photorealistic perspective images and the simplified images are placed on the remote system for access by the browser. Also placed on the remote system is code for enabling the browser to perform the operations discussed above. The images and code are provided from the remote system to the browser responsive to requests from the browser.

In more detail, substantially photorealistic perspective images of various furnishings are generated in step S1701. These images preferably include views of the furnishings at various orientations. The images also preferably include multiple variations of the furnishings based on, for example, style, color, manufacturer and materials. The photorealistic images could be obtained, for example, through computer aided design or through use of a digital camera. In addition, photographs of the furnishings could be scanned into a computer system. Other methods of obtaining the substantially photorealistic images exist.

In step S1702, simplified images of the furniture are generated. These images, which preferably are wire-frame images, can be obtained by modifying the photorealistic images. Alternatively, the images can be created independently of the photorealistic images.

The simplified images and the photorealistic images are placed on the server in step S1703. Then, in step S1704, code is placed on the server for enabling a browser to utilize the images as described above with respect to FIGS. 1 to 16. When a browser connects to the server, for example through the World Wide Web, the server in step S1705 provides the code and the images to the browser.

Manipulating Non-Simplified Images

Speed is not always a consideration for a user. In addition, other solutions to enhancing speed of a room designer may be developed. Thus, in another aspect the invention is a room designer that allows a user to interactively and independently manipulate any images, for example photorealistic images, of furnishings in a perspective view of a room displayed by a browser.

Figure 18:
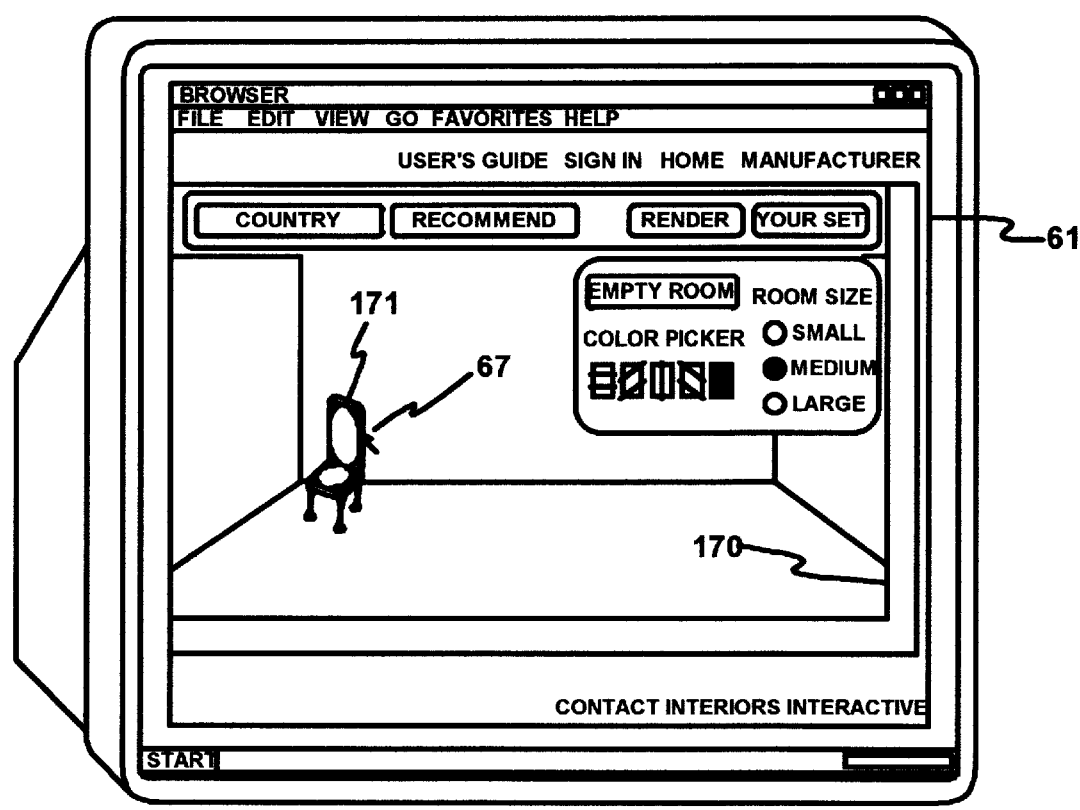
FIG. 18 is a representational view of another embodiment of the invention which allows a user to directly manipulate photorealistic images in a perspective view of a room.

FIG. 18 is a representational view of the an embodiment of the invention which allows a user to directly manipulate, for example, photorealistic images in a perspective view of a room. These images may be simplified images, photorealistic images, or any other types of images of furnishings. In FIG. 18, browser window 61 displays perspective view 170 of a room. Photorealistic image 171 of a furnishing (e.g., a chair in FIG. 18) is manipulated with cursor 67. In this regard, a render button may still be displayed in browser window 61 for activation of some additional rendering, or the render button may be excluded as redundant.

The various types of specification, manipulation, property specification and the like discussed above with reference to FIGS. 3 to 14 are equally applicable to the room designer shown in FIG. 18. For example, room attributes, furnishing position (and scaling), furnishing rotation, furnishing properties and recommended groups of furnishings may be specified while designing the room.

Figure 19:
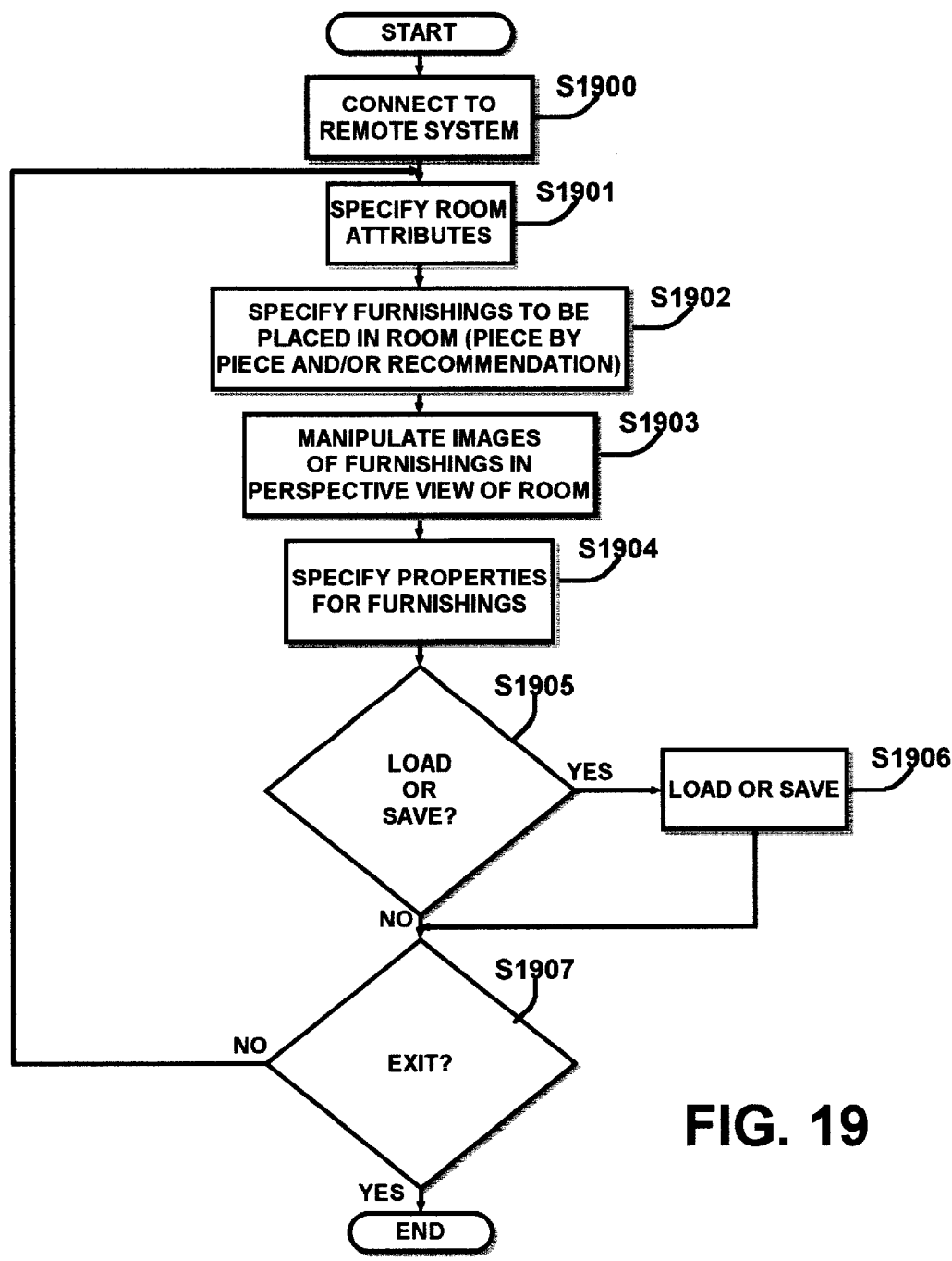
FIG. 19 is a flow chart for explaining the embodiment shown in FIG. 18, from a user's point of view.

FIG. 19 is a flow chart for explaining the embodiment shown in FIG. 18, from a user's point of view. While the steps in FIG. 19 are shown in what is believed to be a particularly useful order, it is entirely possible for the steps to be executed in many different orders without departing from the invention.

Briefly, a user designs a room using a browser by specifying furnishings for the room. The user independently manipulates images of the furnishings in a perspective view of the room displayed by the browser. In this embodiment of the invention, the images may be simplified images, photorealistic images, or any other types of images of furnishings. The user also preferably can specify independent properties for the furnishings.

In more detail, the user in step S1900 instructs a browser such as browser 32 to connect to a site which provides a room designer according to this embodiment of the invention. In step S1901, the user specifies attributes for a room. For example, the user specifies a room type. The browser then shows a perspective view of a room. The user preferably can specify further attributes for the room.

Then, in step S1902, the user specifies furnishings to be shown in the perspective view of the room. The furnishings can be specified individually or as a group (i.e., a recommended group). In response, the browser displays images of the furnishings in the perspective view. These images preferably are obtained by the browser from a remote system.

The user can independently manipulate the images in step S1903. In this context, the term "independent" means independent of manipulation of other images of furnishings in the room.

Manipulation of a group of images of furnishings, for example selecting and moving two images at once, is compatible with the invention. In the case that the user requests a recommended group of furnishings in step S1902, the user preferably can manipulate individual ones of the images of the recommended furnishings in step S1903.

In step S1904, the user can specify independent properties for the furnishings. In this context, the term "independent" means that the properties do not have to be related to properties for other furnishings in the room. In particular, the user preferably can assign each furnishing its own independent properties. Specification of group properties, for example setting all furnishings to a particular color scheme, is compatible with the invention. In the case that the user requests a recommended group of furnishings in step S1902, the user preferably can change the properties of individual ones of the recommended furnishings in step S1904.

If the user desires to save the current room design, or to load a previously saved room design, flow proceeds from step S1905 to S1906. In step S1906, a room design can be loaded or saved, preferably in accordance with sing-in information provided by the user.

The foregoing steps can be repeated until the user desires to exit the room designer in step S1907.

Figure 20:
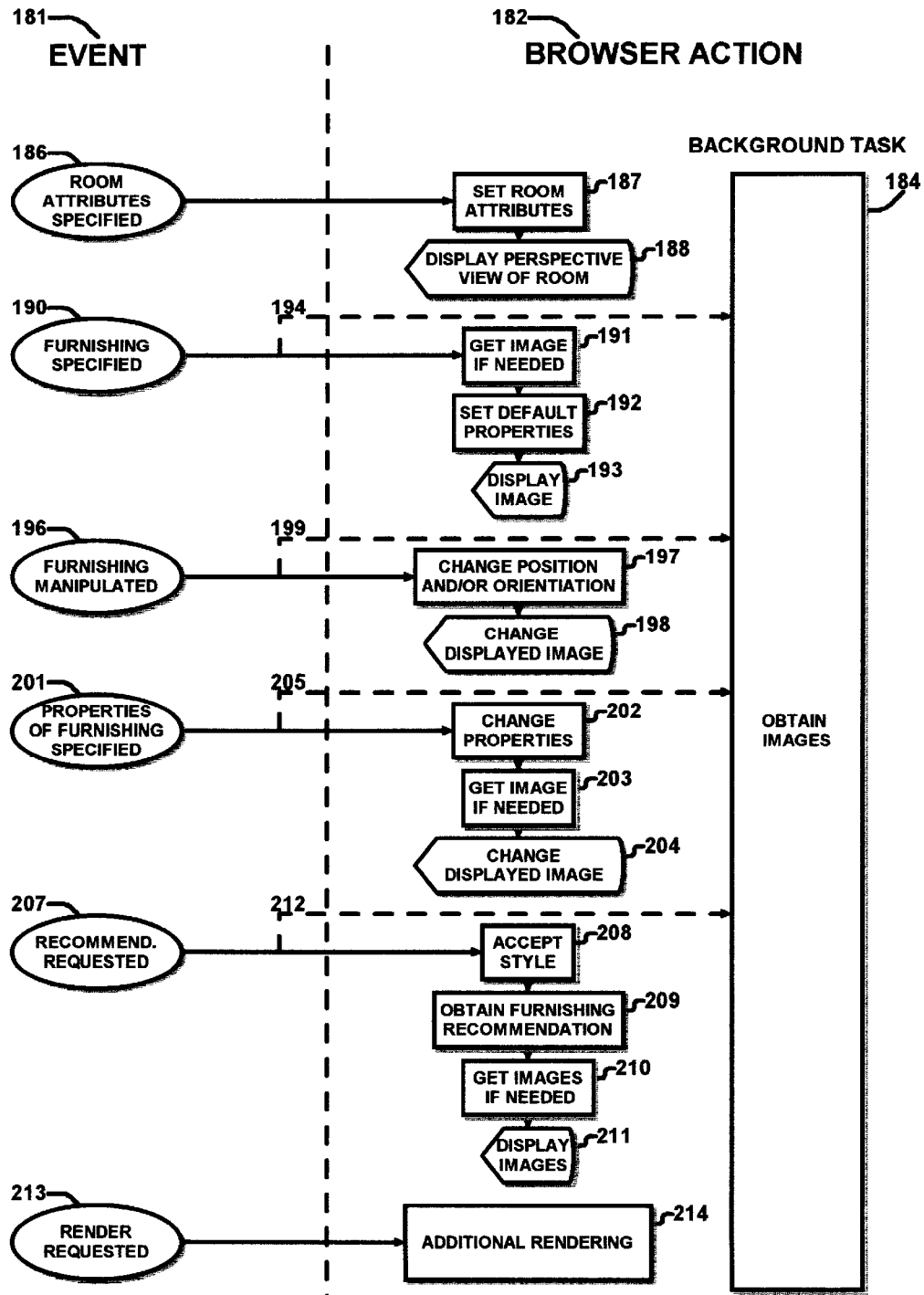
FIG. 20 is a flow diagram for explaining the embodiment shown in FIG. 18, from a browser's point of view.

FIG. 20 is a flow diagram for explaining the embodiment shown in FIG. 18, from a browser's point of view. Preferably, the operations illustrated in FIG. 20 are performed by a browser in accordance with code obtained from a remote system.

Briefly, a browser connected to a system remote to the browser allows a user to design a room by performing at least the following steps: The browser accepts specification of furnishings for a room, displays images of the furnishings in a perspective view of the room, and accepts and displays independent manipulation of individual images of the furnishings in the perspective view of the room. The images may be simplified images, photorealistic images, or any other types of images of furnishings. Preferably, the browser accepts and displays specification of independent properties for the furnishings. The individual images of the furnishings preferably are displayed in accordance with the specification of independent properties.

In more detail, the operation of the browser according to this embodiment of the invention is event driven. Thus, FIG. 20 is divided into events 181 on the left and browser action 182 on the right. These events may occur in many different orders without departing from the invention.

After the browser connects to a remote site and obtains code for implementing the room designer according to this embodiment of the invention, the browser in block 184 preferably begins to obtain images of furnishings. The operation of block 184 preferably runs as a background task until complete. Alternatively, the browser may wait for block 184 to complete before responding to external events.

In response to "room attributes specified" event 186, the browser in block 187 sets room attributes. Then, in block 188, the browser displays a perspective view of a room corresponding to those attributes.

In response to "furnishing specified" event 190, the browser in block 191 obtains an image for the furnishing. According to this embodiment of the invention, the image may be a simplified image, a photorealistic image, or some other type of image. If the image has already been obtained by the browser in block 184, that image is utilized. Otherwise, the browser preferably obtains the image from a remote system. Default properties for the furnishing preferably are set in block 192, and the image is displayed in block 193.

Broken line 194 indicates that upon specification of a furnishing, the browser preferably causes background task 184 to begin to obtain other images related to the specified furnishing, for example rotated images or the like, if necessary.

In response to "furnishing manipulated" event 196, the browser in block 197 changes the position and/or orientation of the image of the manipulated furnishing. Block 197 preferably involves scaling and/or rotating the image. In block 197, at least some of the images of the furnishings can be manipulated independently of other images of the furnishings.

In block 198, the modified image is displayed. In addition, broken line 199 indicates that the browser preferably causes background task 184 to begin to obtain other images related to the modified image, for example rotated images or the like, if necessary.

In response to "properties of furnishing specified" event 201, the browser in block 202 changes the properties for the corresponding furnishing. Preferably, properties for at least some of the furnishings can be changed independently of properties for other furnishings in the room.

Preferably this embodiment of the invention changes the corresponding image of a furnishing to reflect changes to the properties for that furnishing. If the changes are reflected in the image, a modified image may be obtained in block 203, if necessary. In block 204, the modified image is displayed. Preferably, background task 184 also begins to obtain any needed related images, as indicated by broken line 205.

In response to "recommendation requested" event 207, the browser in block 208 accepts a style or other information describing the type of requested furnishings. In block 209, the corresponding furnishing recommendation is obtained. Any needed images are obtained in block 210, and the images are displayed in block 211. Background task 184 preferably begins to acquire any needed related images, as indicated by broken line 212.

Optionally, this embodiment of the invention can respond to a request for rendering by performing some type of rendering so as to display a more realistic version of the room. For example, furnishings could be rendered more realistically, non-furnishing elements could be rendered, or furnishings could be rendered to include effects such as lighting. Alternatively, the perspective view of the room which is manipulated by the user may be the most realistic view provided by the room designer, making a render request redundant. Thus, block 213 is an optional event. In block 213, the browser responds to a "render requested" event by performing any additional rendering in block 214.

Figure 21:
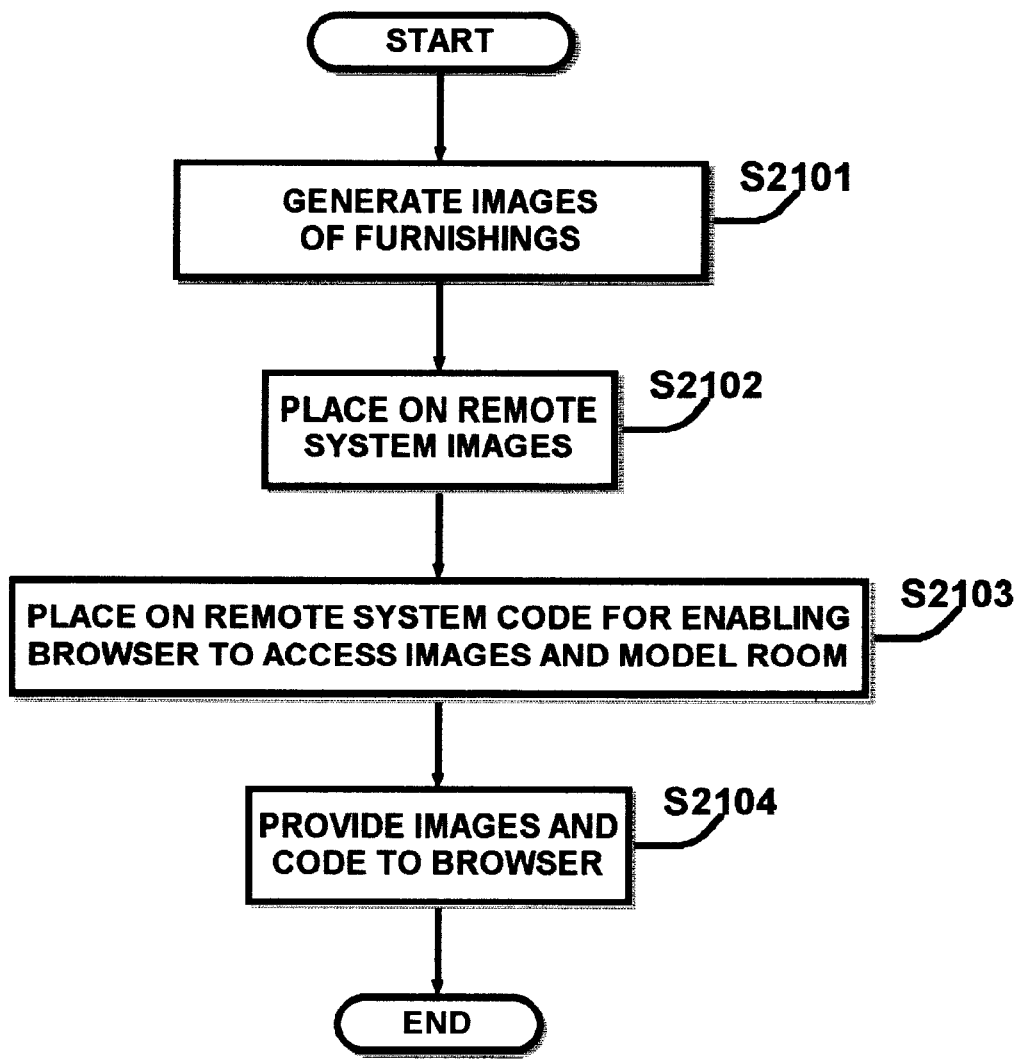
FIG. 21 is a flowchart for explaining set-up of a remote system which allows a connected browser to design a room according to the embodiment shown in FIG. 18.

FIG. 21 is a flowchart for explaining set-up of a remote system which allows a connected browser to design a room according to the embodiment shown in FIG. 18.

Briefly, rotatable and scalable images of different types of furnishings are generated. The images are placed on the remote system for access by the browser. Also placed on the remote system is code for enabling the browser to perform the operations discussed above with respect to FIGS. 18 to 20. The images and code are provided from the remote system to the browser responsive to requests from the browser. The images may be simplified images, photorealistic images, or any other types of images of the furnishings.

In more detail, images of various furnishings are generated in step S2101. These images preferably include views of the furnishings at various orientations. The images also preferably include multiple variations of the furnishings based on, for example, style, color, manufacturer and materials. The images could be obtained, for example, through computer aided design or through use of a digital camera. In addition, photographs of the furnishings could be scanned into a computer system. Other methods of obtaining the images exist.

In step S2102, the images are placed on the server. Then, in step S2103, code is placed on the server for enabling a browser to utilize the images as described above with respect to FIGS. 18 to 20. When a browser connects to the server, for example through the World Wide Web, the server in step S2104 provides the code and the images to the browser.

The invention is described above with respect to particular illustrative embodiments. However, alternative embodiments exist which do not depart from the scope and spirit of the invention. Therefore, the scope of the invention encompasses the following claims and their legal equivalents and is not limited to the embodiments discussed above.

What is claimed is:

1. A method for designing a room using a browser connected to a system remote to the browser, comprising the steps of:

displaying a perspective view of the room;

accepting specification of individual furnishings to be added to the room;

displaying simplified images of the individual furnishings in the perspective view of the room;

accepting and displaying independent manipulation of the simplified images of the individual furnishings in the perspective view of the room; and rendering the room with substantially photorealistic perspective images of the individual furnishings in the perspective view of the room, wherein the substantially photorealistic perspective images are obtained from the remote system, and wherein the room is rendered in accordance with the independent manipulation of the simplified images so as to present corresponding perspective views of the individual furnishings.

2. A method according to claim 1, wherein the furnishings include furniture.

3. A method according to claim 1, further comprising the step of obtaining at least part of the substantially photorealistic perspective images from the remote system while the simplified images are being independently manipulated.

4. A method according to claim 1, wherein the step of accepting and displaying independent manipulation of the simplified images further comprises the step of accepting and displaying independent position changes for the simplified images in the perspective view of the room.

5. A method according to claim 4, wherein the step of accepting and displaying independent manipulation of the simplified images further comprises the step of scaling the simplified images within the perspective view of the room in accordance with the position changes.

6. A method according to claim 1, wherein the step of accepting and displaying independent manipulation of the simplified images further comprises the step of accepting and displaying independent orientation changes for the simplified images in the perspective view of the room.

7. A method according to claim 1, further comprising the step of accepting and displaying specification of independent properties for the individual furnishings, wherein the simplified images are displayed also in accordance with the specification of independent properties.

8. A method according to claim 7, wherein when the room is rendered, the room is rendered with photorealistic perspective images also in accordance with the specification of independent properties.

9. A method according to claim 7, wherein the independent properties include a manufacturer for the furnishings, a style for the furnishings, a color scheme for the furnishings, or a material used in the furnishings.

10. A method according to claim 7, further comprising the step of obtaining at least part of the substantially photorealistic perspective images from the remote system while the independent properties are being specified.

11. A method according to claim 1, further comprising the steps of:
   accepting specification of a recommended group of furnishings; and
   displaying in the perspective view of the room simplified images of the furnishings included in the recommended group;
   wherein the step of accepting and displaying independent manipulation of the simplified images also accepts and displays independent manipulation of the simplified images of the furnishings included in the recommended group; and
   wherein the step of rendering the room also renders the room with substantially photorealistic perspective images of the furnishings included in the recommended group.

12. A method according to claim 11, further comprising the step of accepting and displaying specification of independent properties for the specified individual furnishings and for the furnishings in the recommended group, wherein the simplified images are displayed also in accordance with the specification of independent properties.

13. A method according to claim 12, wherein when the room is rendered, the room is rendered with photorealistic perspective images also in accordance with the specification of independent properties.

14. A method according to claim 1, further comprising the step of accepting and displaying specification of attributes for the room, wherein the perspective view of the room is displayed also in accordance with the specification of attributes for the room.

15. A method according to claim 1, wherein the simplified images are wire-frame images.

16. A memory storing instructions for designing a room using a browser connected to a system remote to the browser, the instructions comprising:
   code to display a perspective view of the room;
   code to accept specification of individual furnishings to be added to the room;
   code to display simplified images of the individual furnishings in the perspective view of the room;
   code to accept and to display independent manipulation of the simplified images of the individual furnishings in the perspective view of the room; and
   code to render the room with substantially photorealistic perspective images of the individual furnishings in the perspective view of the room, wherein the substantially photorealistic perspective images are obtained from the remote system, and wherein the room is rendered in accordance with the independent manipulation of the simplified images so as to present corresponding perspective views of the individual furnishings.

17. A memory according to claim 16, wherein the furnishings include furniture.

18. A memory according to claim 16, wherein the instructions further comprise code to obtain at least part of the substantially photorealistic perspective images from the remote system while the simplified images are being independently manipulated.

19. A memory according to claim 16, wherein the code to accept and to display independent manipulation of the simplified images further comprises:
   code to accept and to display independent position changes for the simplified images in the perspective view of the room; and
   code to scale the simplified images within the perspective view of the room in accordance with the position changes.

20. A memory according to claim 16, wherein the code to accept and to display independent manipulation of the simplified images further comprises code to accept and to display independent orientation changes for the simplified images in the perspective view of the room.

21. A memory according to claim 16, wherein the instructions further comprise code to accept and to display specification of independent properties for the individual furnishings;
   wherein the simplified images are displayed also in accordance with the specification of independent properties; and
   wherein when the room is rendered, the room is rendered with photorealistic perspective images also in accordance with the specification of independent properties.

22. A memory according to claim 21, wherein the instructions further comprise code to obtain at least part of the substantially photorealistic perspective images from the remote system while the independent properties are being specified.

23. A memory according to claim 16, wherein the instructions further comprise:
   code to accept specification of a recommended group of furnishings; and
   code to display in the perspective view of the room simplified images of the furnishings included in the recommended group;
   wherein the code to accept and to display independent manipulation of the simplified images also accepts and displays independent manipulation of the simplified images of the furnishings included in the recommended group; and
   wherein the code to render the room also renders the room with substantially photorealistic perspective images of the furnishings in the recommended group.

24. A memory according to claim 23, wherein the instructions further comprise code to accept and to display specification of independent properties for the specified individual furnishings and for the furnishings in the recommended group;
   wherein the simplified images are displayed also in accordance with the specification of independent properties; and
   wherein when the room is rendered, the room is rendered with photorealistic perspective images also in accordance with the specification of independent properties.

25. A memory according to claim 16, wherein the instructions further comprise code to accept and to display specification of attributes for the room, wherein the perspective view of the room is displayed also in accordance with the specification of attributes for the room.

26. A method of providing images and code for designing a room to a browser connected to a system remote to the browser, comprising the steps of:
   generating rotatable and scalable substantially photorealistic perspective images of different types of furnishings, the substantially photorealistic perspective images for each different type of furnishing differing according to properties for that type of furnishing;
   generating rotatable and scalable simplified images of the different types of furnishings;
   placing the substantially photorealistic perspective images and the simplified images on the remote system for access by the browser; and placing code on the remote system, the code for enabling the browser to perform at least the steps of: (a) displaying a perspective view of the room; (b) accepting specification of individual furnishings to be added to the room; (c) displaying simplified images of the individual furnishings in the perspective view of the room; (d) accepting and displaying independent manipulation of the simplified images of the individual furnishings in the perspective view of the room; and (e) rendering the room with substantially photorealistic perspective images of the individual furnishings in the perspective view of the room, wherein the substantially photorealistic perspective images are obtained from the remote system, and wherein the room is rendered in accordance with the independent manipulation of the simplified images so as to present corresponding perspective views of the individual furnishings.

27. A method according to claim 26, further comprising the step of providing the images and code from the remote system to the browser responsive to requests from the browser.

28. A method according to claim 26, wherein the code further enables the browser to perform the step of: (f) accepting and displaying specification of independent properties for the individual furnishings;

wherein the simplified images are displayed also in accordance with the specification of independent properties; and wherein when the room is rendered, the room is rendered with photorealistic perspective images also in accordance with the specification of independent properties.

29. A method according to claim 26, wherein the code further enables the browser to perform the steps of: (f) accepting specification of a recommended group of furnishings; and (g) displaying in the perspective view of the room simplified images of furnishings included in the recommended group of furnishings;

wherein the step of accepting and displaying independent manipulation of the simplified images also accepts and displays independent manipulation of the simplified images of the furnishings included in the recommended group; and wherein the step of rendering the room also renders the room with substantially photorealistic perspective images of the furnishings in the recommended group.

30. A method for designing a room using a browser connected to a system remote to the browser, comprising the steps of:

specifying individual furnishings to be displayed in a perspective view of the room;

independently manipulating simplified images of the individual furnishings in the perspective view of the room; and instructing the browser to render the room with substantially photorealistic perspective images of the individual furnishings in the perspective view of the room, wherein the substantially photorealistic perspective images are obtained from the remote system.

31. A method according to claim 30, further comprising the step of specifying independent properties for the individual furnishings.

32. A method according to claim 30, further comprising the step of specifying a recommended group of furnishings to be displayed in the perspective view of the room.

* * * * *